(12) United States Patent
Jaeger

(10) Patent No.: US 7,321,882 B2
(45) Date of Patent: Jan. 22, 2008

(54) METHOD FOR SUPERVISED TEACHING OF A RECURRENT ARTIFICIAL NEURAL NETWORK

(75) Inventor: Herbert Jaeger, Koenigewinter (DE)

(73) Assignee: Fraunhofer-Gesellschaft zur Foederung der Angewandten Forschung e.V., Munich (DE)

( * ) Notice: Subject to any disclaimer, the term of this patent is extended or adjusted under 35 U.S.C. 154(b) by 636 days.

(21) Appl. No.: 10/398,914

(22) PCT Filed: Oct. 5, 2001

(86) PCT No.: PCT/EP01/11490

§ 371 (c)(1),
(2), (4) Date: May 29, 2003

(87) PCT Pub. No.: WO02/31764

PCT Pub. Date: Apr. 18, 2002

(65) Prior Publication Data

US 2004/0015459 A1    Jan. 22, 2004

(30) Foreign Application Priority Data

Oct. 13, 2000  (EP)  ................. 00122415

(51) Int. Cl.
*G06E 1/00*       (2006.01)
*G06E 3/00*       (2006.01)
*G06F 15/18*      (2006.01)
*G06G 7/00*       (2006.01)
*G06N 3/00*       (2006.01)
*G06N 3/02*       (2006.01)

(52) U.S. Cl. .......................... 706/30; 706/15
(58) Field of Classification Search .................. 706/30

See application file for complete search history.

(56) References Cited

U.S. PATENT DOCUMENTS

| | | | | |
|---|---|---|---|---|
| 4,884,229 A * | 11/1989 | Dekker | ................ | 708/314 |
| 5,204,872 A * | 4/1993 | Staib et al. | ................ | 373/104 |
| 5,406,581 A * | 4/1995 | Staib et al. | ................ | 373/104 |
| 5,408,424 A * | 4/1995 | Lo | ................ | 708/303 |
| 5,425,130 A * | 6/1995 | Morgan | ................ | 704/270 |
| 5,428,710 A * | 6/1995 | Toomarian et al. | ................ | 706/25 |
| 5,465,321 A * | 11/1995 | Smyth | ................ | 706/20 |
| 5,479,571 A * | 12/1995 | Parlos et al. | ................ | 706/25 |
| 5,486,996 A * | 1/1996 | Samad et al. | ................ | 700/32 |
| 5,513,098 A * | 4/1996 | Spall et al. | ................ | 700/38 |
| 5,606,646 A * | 2/1997 | Khan et al. | ................ | 706/2 |
| 5,613,042 A * | 3/1997 | Chung et al. | ................ | 706/30 |
| 5,649,065 A * | 7/1997 | Lo et al. | ................ | 706/22 |
| 5,659,583 A * | 8/1997 | Lane | ................ | 375/346 |
| 5,671,336 A * | 9/1997 | Yoshida et al. | ................ | 706/30 |
| 5,699,487 A * | 12/1997 | Richardson | ................ | 706/20 |
| 5,706,400 A * | 1/1998 | Omlin et al. | ................ | 706/16 |
| 5,745,653 A * | 4/1998 | Jesion et al. | ................ | 706/23 |
| 5,748,847 A * | 5/1998 | Lo | ................ | 706/14 |
| 5,764,858 A * | 6/1998 | Sheu et al. | ................ | 706/26 |
| 5,781,700 A * | 7/1998 | Puskorius et al. | ................ | 706/14 |
| 5,822,741 A | 10/1998 | Fischthal | | |
| 5,847,952 A * | 12/1998 | Samad | ................ | 700/48 |
| 5,867,397 A * | 2/1999 | Koza et al. | ................ | 703/14 |
| 5,909,676 A * | 6/1999 | Kano | ................ | 706/25 |
| 5,943,659 A * | 8/1999 | Giles et al. | ................ | 706/2 |
| 5,960,391 A * | 9/1999 | Tateishi et al. | ................ | 704/232 |
| 5,963,929 A * | 10/1999 | Lo | ................ | 706/22 |
| 5,983,180 A * | 11/1999 | Robinson | ................ | 704/254 |
| 5,987,444 A * | 11/1999 | Lo | ................ | 706/25 |
| 6,092,018 A * | 7/2000 | Puskorius et al. | ................ | 701/110 |
| 6,151,592 A * | 11/2000 | Inazumi | ................ | 706/16 |
| 6,151,594 A * | 11/2000 | Wang | ................ | 706/43 |
| 6,169,981 B1 * | 1/2001 | Werbos | ................ | 706/23 |
| 6,175,554 B1 * | 1/2001 | Jang et al. | ................ | 370/229 |
| 6,212,508 B1 * | 4/2001 | Sterzing et al. | ................ | 706/15 |
| 6,272,193 B1 * | 8/2001 | Eglit | ................ | 375/355 |
| 6,601,051 B1 * | 7/2003 | Lo et al. | ................ | 706/23 |
| 6,751,601 B2 * | 6/2004 | Zegers | ................ | 706/16 |
| 6,839,303 B2 * | 1/2005 | Handa et al. | ................ | 367/100 |

| | | | |
|---|---|---|---|
| 6,856,577 | B1 * | 2/2005 | Handa et al. ............... 367/119 |

FOREIGN PATENT DOCUMENTS

| | | |
|---|---|---|
| EP | 0 574 951 | 12/1993 |
| JP | 0 374 604 A2 * | 12/1989 |

OTHER PUBLICATIONS

Qualitative limitations incurred in implementations of recurrent neural networks Michel, A.N.; Kaining Wang; Derong Liu; Hui Ye; Control Systems Magazine, IEEE vol. 15, Issue 3, Jun. 1995 pp. 52-65.*

A Fully-Automated Measurement System for 77-GHz Mixers Wagner, C.; Treml, M.; Hartmann, M.; Stelzer, A.; Jaeger, H.; Instrumentation and Measurement Technology Conference Proceedings, 2007 IEEE May 1-3, 2007 pp. 1-4 Digital Object Identifier 10.1109/IMTC.2007.379425.*

Reservoir riddles: suggestions for echo state network research Jaeger, H.; Neural Networks, 2005. IJCNN '05. Proceedings. 2005 IEEE International Joint Conference on vol. 3, Jul. 31-Aug. 4, 2005 pp. 1460-1462 vol. 3 Digital Object Identifier 10.1109/IJCNN.2005. 1556090.*

Plasmon light scattering of a single gold nanoparticle attached to a single mode optical fiber tip Eah, S.; Jaeger, H.M.; Scherer, N.F.; Xiao-An Lin; Wiederrecht, G.P.; Quantum Electronics Conference, 2004. (IQEC). International 2004 pp. 840-842.*

Class E with parallel circuit—a new challenge for high-efficiency RF and microwave power amplifiers Grebennikov, A.V.; Jaeger, H.; Microwave Symposium Digest, 2002 IEEE MTT-S International vol. 3, Jun. 2-7, 2002 pp. 1627-1630 Digital Object Identifier 10.1109/MWSYM.2002.1012169.*

A framework for plan execution in behavior-based robots Hertzberg, J.; Jaeger, H.; Zimmer, U.; Morignot, P.; Intelligent Control (ISIC), 1998. Held jointly with IEEE International Symposium on Computational Intelligence in Robotics and Automation (CIRA) Intelligent Systems and Semiotics (ISAS), Sep. 14-17, 1998 pp. 8-13.*

Self-organization of feature detectors in time sequences (SOFT)-a neural network approach to multidimensional signal analysis Wismuller, A.; Jaeger, H.; Ritter, H.; Dersch, D.R.; Palm, G.;Neural Networks Proceedings, 1998, IEEE World Congress on Computational Intelligence. IEEE International Joint Conference on vol. 1, May 1998 pp. 575-580 vol. 1.*

Guidance integrated fuzing analysis and simulation Chopper, K.; Jaeger, H.; Stephens, L.; Burdick, D.; Lin, C.-F.; Yang, C.; Control Applications, 1992., First IEEE Conference on Sep. 13-16, 1992 pp. 750-755 vol. 2 Digital Object Identifier 10.1109/CCA.1992. 269753.*

Seeker-Optimized Guidance Integrated Fuzing Chopper, K.; Jaeger, H.; Stephens, L.; Burdic, D.; Chun Yang; Ching-Fang Lin; Aerospace Control Systems, 1993. Proceedings. The First IEEE Regional Conference on May 25-27, 1993 pp. 559-562.*

Improved upper bound on step-size parameters of discrete-time recurrent neural networks for linear inequality and equation systemXue-Bin Liang; Shiu Kit Tso; Circuits and Systems I: Fundamental Theory and Applications, IEEE Transactions on [see also Circuits and Systems I: IEEE Transactions on] vol. 49, Issue 5, May 2002 pp. 692-698.*

Global stability analysis of discrete-time recurrent neural networks Barabanov, N.E.; Prokhorov, D.V.; American Control Conference, 2001. Proceedings of the 2001 vol. 6, Jun. 25-27, 2001 pp. 4550-4555 vol. 6 Digital Object Identifier 10.1109/ACC.2001.945696.*

Absolute stability conditions for discrete-time recurrent neural networks Liang Jin; Nikiforuk, P.N.; Gupta, M.M.; Neural Networks, IEEE Transactions on vol. 5, Issue 6, Nov. 1994 pp. 954-964 Digital Object Identifier 10.1109/72.329693.*

Noisy recurrent neural networks: the discrete-time case Olurotimi, O.; Das, S.; Neural Networks, IEEE Transactions on vol. 9, Issue 5, Sep. 1998 pp. 937-946 Digital Object Identifier 10.1109/72. 712165.*

A discrete-time multivariable neuro-adaptive control for nonlinear unknown dynamic systems Chih-Lyang Hwang; Ching-Hung Lin; Systems, Man and Cybernetics, Part B, IEEE Transactions on vol. 30, Issue 6, Dec. 2000 pp. 865-877 Digital Object Identifier 10.1109/3477.891148.*

Discrete-time algebraic Riccati inequation neuro-LMI solution Tamariz, A.D.R.; Bottura, C.P.; Systems, Man and Cybernetics, 2005 IEEE International Conference on vol. 2, Oct. 10-12, 2005 pp. 1748-1752 vol. 2 Digital Object Identifier 10.1109/ICSMC.2005. 1571401.*

Discrete-time systems neuro-Riccati equation solution Tamariz, A.D.R.; Bottura, C.R.; Neural Networks, 2005. IJCNN '05. Proceedings. 2005 IEEE International Joint Conference on vol. 4, Jul. 4-31, 2005 pp. 2261-2265 vol. 4.*

Stability analysis of discrete-time recurrent neural networks Barabanov, N.E.; Prokhorov, D.V.; Neural Networks, IEEE Transactions on vol. 13, Issue 2, Mar. 2002 pp. 292-303 Digital Object Identifier 10.1109/72.991416.*

Recurrent nets that time and count Gers, F.A.; Schmidhuber, J.; Neural Networks, 2000. IJCNN 2000, Proceedings of the IEEE-INNS-ENNS International Joint Conference on vol. 3, Jul. 24-27, 2000 pp. 189-194 vol. 3 Digital Object Identifier 10.1109/IJCNN. 2000.861302.*

Training Recurrent Neurocontrollers for Robustness With Derivative-Free Kalman Filter Prokhorov, D. V.; Neural Networks, IEEE Transactions on vol. 17, Issue 6, Nov. 2006 pp. 1606-1616 Digital Object Identifier 10.1109/TNN.2006.880580.*

A Recurrent Control Neural Network for Data Efficient Reinforcement Learning Schaefer, A.M.; Udluft, S.; Zimmermann, H.-G.; Approximate Dynamic Programming and Reinforcement Learning, 2007, ADPRL 2007. IEEE International Symposium on Apr. 1-5, 2007 pp. 151-157 Digital Object Identifier 10.1109/ADPRL.2007. 368182.*

A neural network model and its application Liu Meiqin; Zhang Senlin; Yan Gangfeng; Wang Shouguang; Systems, Man and Cybernetics, 2004 IEEE International Conference on vol. 6, Oct. 10-13, 2004 pp. 5864-5869 vol. 6 Digital Object Identifier 10.1109/ ICSMC.2004.1401131.*

Recurrent neural networks for phasor detection and adaptive identification in power system control and protection Kamwa, I.; Grondin, R.; Sood, V.K.; Gagnon, C.; Van Thich Nguyen; Mereb, J.; Instrumentation and Measurement, IEEE Transaction on vol. 45, Issue 2, Apr. 1996 pp. 657-664 Digital Object Identifier 10.1109/ 19.492805.*

Delayed Standard Neural Network Models for Control Systems Liu M. ; IEEE Transactions on Neural Networks : Accepted for future publication vol. PP, Issue 99, 2007 pp. 1-1 Digital Object Identifier 10.1109/TNN.2007.894084.*

Use of a recurrent neural network in discrete sliding-mode control Fang, Y.; Chow, T.W.S.; Li, X.D.; Control Theory and Applications, IEE Proceedings- vol. 146, Issue 1, Jan. 1999 pp. 84-90 Digital Object Identifier 10.1049/ip-cta:19990376.*

Towards an efficient hardware implementation of recurrent neural network based multiuser detection Teich, W.G.; Engelhart, A.; Schlecker, W.; Gessler, R.; Pfleiderer, H.-J.; Spread Spectrum Techniques and Applications, 2000 IEEE Sixth International Symposium on vol. 2, Sep. 6-8, 2000 pp. 662-665 vol. 2 Digital Object Identifier 10.1109/ISS.*

Chattering free sliding mode control based on recurrent neural network Fang, Y.; Chow, T.W.S.; Systems, Man, and Cybernetics, 1998. 1998 IEEE International Conference on vol. 2, Oct. 11-14, 1998 pp. 1726-1731 vol. 2 Digital Object Identifier 10.1109/ ICSMC.1998.728143.*

Neco R. R., et al., "Asynchronous Translations With Recurrent Neural Nets" 1997 IEEE International Conference on Neural Networks Proceedings (Cat. No. 97CH36109) pp. 9-12 Jun. 1997.

Carrasco R. C., et al. "Efficient Encoding of Finite Automata in Discrete-Time Recurrent Neural Networks" ICANN99. Ninth International Conference on Artificial Neural Networks (IEE Conf. Publ. No. 470), pp. 673-677, vol. 2, 1999.

Dit-Yan Yeung "A Grammatical Inference Approach to On-Line Handwriting Modeling and Recognition" A Pilot Study: Proceedings of the Third International Conference on Document Analysis and Recognition Proceedings of 3rd International Conference on Document Analysis and Recognition, —pp. 14-16 Aug. 1995.

\* cited by examiner

*Primary Examiner*—Michael B. Holmes
(74) *Attorney, Agent, or Firm*—Birch, Stewart, Kolasch & Birch, LLP

(57) ABSTRACT

A method for the supervised teaching of a recurrent neutral network (RNN) is disclosed. A typical embodiment of the method utilizes a large (50 units or more), randomly initialized RNN with a globally stable dynamics. During the training period, the output units of this RNN are teacher-forced to follow the desired output signal. During this period, activations from all hidden units are recorded. At the end of the teaching period, these recorded data are used as input for a method which computes new weights of those connections that feed into the output units. The method is distinguished from existing training methods for RNNs through the following characteristics: (1) Only the weights of connections to output units are changed by learning—existing methods for teaching recurrent networks adjust all network weights. (2) The internal dynamics of large networks are used as a "reservoir" of dynamical components which are not changed, but only newly combined by the learning procedure—existing methods use small networks, whose internal dynamics are themselves completely re-shaped through learning.

41 Claims, 31 Drawing Sheets

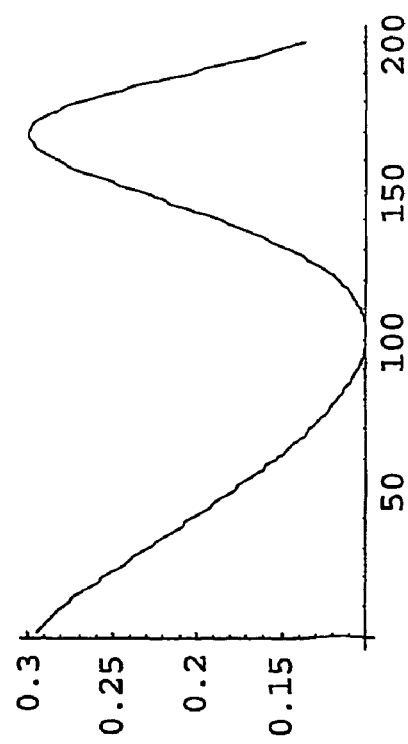
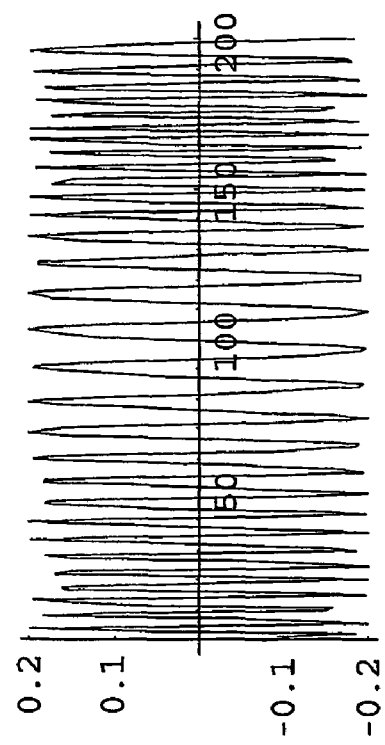
FIG. 7 (b)
FIG. 7 (a)

United States Patent US 7,321,882 B2

METHOD FOR SUPERVISED TEACHING OF A RECURRENT ARTIFICIAL NEURAL NETWORK

This application is the national phase under 35 U.S.C. § 371 of PCT International Application No. PCT/EP01/11490 which has an International filing date of Oct. 5, 2001, which designated the United States of America.

TECHNICAL FIELD OF THE INVENTION

The present invention relates to the field of supervised teaching of recurrent neural networks.

BACKGROUND OF THE INVENTION

Artificial neural networks (ANNs) today provide many established methods for signal processing, control, prediction, and data modeling for complex nonlinear systems. The terminology for describing ANNs is fairly standardized. However, a brief review of the basic ideas and terminology is provided here.

A typical ANN consists of a finite number K of units, which at a discrete time t (where t=1,2,3 . . . ) have an activation $x_i(t) \cdot (i=1, \ldots, K)$. The units are mutually linked by connections with weights $w_{ji}$, (where i, j=1, . . . , K and where $w_{ji}$ is the weight of the connection from the i-th to the j-th unit), which typically are assigned real numbers. A weight $w_{ji}=0$ indicates that there is no connection from the i-th to the j-th unit. It is convenient to collect the connection weights in a connection matrix $W=(w_{ji})_{j,i=1, \ldots, K}$. The activation of the j-th unit at time t+1 is derived from the activations of all network units at time t by $$x_j(t+1) = f_j\left(\sum_{i=1,\ldots,K} w_{ji} x_i(t)\right), K \text{ statt } N \quad (1)$$

where the transfer function $f_j$ typically is a sigmoid-shaped function (linear or step functions are also relatively common). In most applications, all units have identical transfer functions. Sometimes it is beneficial to add noise to the activations. Then (1) becomes $$x_j(t+1) = f_j\left(\sum_{i=1,\ldots,K} w_{ji} x_i(t)\right) + v(t), K \text{ statt } N \quad (1')$$

where v(t) is an additive noise term.

Some units are designated as output units; their activation is considered as the output of the ANN. Some other units may be assigned as input units; their activation $x_i(t)$ is not computed according to (1) but is set to an externally given input $u_i(t)$, i.e.

$$x_i(t) = u_i(t) \quad (2)$$

in the case of input units.

Most practical applications of ANNs use feedforward networks, in which activation patterns are propagated from an input layer through hidden layers to an output layer. The characteristic feature of feedforward networks is that there are no connection cycles. In formal theory, feedforward networks represent input-output functions. A typical way to construct a feedforward network for a given functionality is to teach it from a training sample, i.e. to present it with a number of correct input-output-pairings, from which the network learns to approximately repeat the training sample and to generalize to other inputs not present in the training sample. Using a correct training sample is called supervised learning. The most widely used supervised teaching method for feedforward networks is the backpropagation algorithm, which incrementally reduces the quadratic output error on the training sample by a gradient descent on the network weights. The field had its breakthrough when efficient methods for computing the gradient became available, and is now an established and mature subdiscipline of pattern classification, control engineering and signal processing.

A particular variant of feedforward networks, radial basis function networks (RBF networks), can be used with a supervised learning method that is simpler and faster than backpropagation. (An introduction to RBF networks is given in the article "Radial basis function networks" by D. Lowe, in: Handbook of Brain Theory and Neural Networks, M. A. Arbib (ed.), MIT Press 1995, p. 779-782) Typical RBF networks have a hidden layer whose activations are computed quite differently from (1). Namely, the activation of the j-th hidden unit is a function $$g_j(\|u - v_j\|) \quad (3)$$

of the distance between the input vector u from some reference vector $v_j$. The activation of output units follows the prescription (1), usually with a linear transfer function. In the teaching process, the activation mechanism for hidden units is not changed. Only the weights of hidden-to-output connections have to be changed in learning. This renders the learning task much simpler than in the case of backpropagation: the weights can be determined off-line (after presentation of the training sample) using linear regression methods, or can be adapted on-line using any variant of mean square error minimization, for instance variants of the least-mean-square (LMS) method.

If one admits cyclic paths of connections, one obtains recurrent neural networks (RNNs). The hallmark of RNNs is that they can support self-exciting activation over time, and can process temporal input with memory influences. From a formal perspective, RNNs realize nonlinear dynamical systems (as opposed to feedforward networks which realize functions). From an engineering perspective, RNNs are systems with a memory. It would be a significant benefit for engineering applications to construct RNNs that perform a desired input-output-dynamics. However, such applications of RNNs are still rare. The major reason for this rareness lies in the difficulty of teaching RNNs. The state of the art in supervised RNN learning is marked by a number of variants of the backpropagation through time (BPTT) method. A recent overview is provided by A. F. Atiya and A. G. Parlos in the article "New Results on Recurrent Network Training: Unifying the Algorithms and Accelerating Convergence", IEEE Transactions on Neural Networks, vol. 11 No 3 (2000), 697-709. The intuition behind BPTT is to unfold the recurrent network in time into a cascade of identical copies of itself, where recurrent connections are re-arranged such that they lead from one copy of the network to the next (instead back into the same network). This "unfolded" network is, technically, a feedforward network and can be teached by suitable variants of teaching methods for feedforward networks. This way of teaching RNNs inherits the iterative, gradient-descent nature of standard backpropagation, and multiplies its intrinsic cost with the number of copies used in the "unfolding" scheme. Convergence is difficult to steer and often slow, and the single iteration steps are costly. By force of computational costs, only relatively small networks can be trained. Another difficulty is that the back-propagated gradient estimates quickly degrade in accuracy (going to zero or infinity), thereby precluding the learning of memory effects of timespans greater than approx. 10 timesteps. These and other difficulties have so far prevented RNNs from being widely used.

SUMMARY OF THE INVENTION

The present invention presents a novel method for the supervised teaching of RNNs. The background intuitions behind this method are quite different from existing BPTT approaches. The latter try to meet the learning objective by adjusting every weight within the network, thereby attaining a minimal-size network in which every unit contributes maximally to the desired overall behavior. This leads to a small network that performs a particular task. By contrast, the method disclosed in the present invention utilizes a large recurrent network, whose internal weights (i.e. on hidden-to-hidden, input-to-hidden, or output-to-hidden connections) are not changed at all. Intuitively, the large, unchanged network is used as a rich "dynamical reservoir" of as many different nonlinear dynamics as there are hidden units. Another perspective on this reservoir network is to view it as an overcomplete basis. Only the hidden-to-output connection weights are adjusted in the teaching process. By this adjustment, the hidden-to-output connections acquire the functionality of a filter which distills and re-combines from the "reservoir" dynamical patterns in a way that realizes the desired learning objective.

A single instantiation of the "reservoir" network can be re-used for many tasks, by adding new output units and separately teaching their respective hidden-to-output weights for each task. After learning, arbitrarily many such tasks can be carried out in parallel, using the same single instantiation of the large "reservoir" network. Thereby, the overall cost of using an RNN set up and trained according to the present invention is greatly reduced in cases where many different tasks have to be carried out on the same input data. This occurs e.g. when a signal has to processed by several different filters.

The temporal memory length of RNNs trained with the method of the invention is superior to existing methods. For instance, "short term memories" of about 100 time steps are easily achievable with networks of 400 units. Examples of this are described later in this document (Section on Examples).

The invention has two aspects: (a), architectural (structure of the RNN, its setup and initialization), and (b), procedural (teaching method). Both aspects are interdependent.

Dynamical Reservoir (DR)

According to one architectural aspect of the invention, there is provided a recurrent neural network whose weights are fixed and are not changed by subsequent learning. The function of this RNN is to serve as a "reservoir" of many different dynamical features, each of these being realized in the dynamics of the units of the network Henceforward, this RNN will be called the dynamical reservoir, and abbreviated by DR.

Preferably, the DR is large, i.e. has in the order of 50 or more (no upper limit) units.

Preferably, the DR's spontaneous dynamics (with zero input) is globally stable, i.e. the DR converges to a unique stable state from every starting state.

In applications where the processed data has a spatial structuring (e.g., video images), the connectivity topology of the DR may also carry a spatial structure.

Input Presentation

According to another architectural aspect of the invention, n-dimensional input u (t) at time t(t=1,2,3 . . . ) is presented to the DR by any means such that the DR is induced by the input to exhibit a rich excited dynamics.

The particular way in which input is administered is of no concern for the method of the invention. Some possibilities which are traditionally used in the RNN field are now briefly mentioned.

Preferably, the input is fed into the DR by means of extra input units. The activations of such input units is set to the input u(t) according to Eq. (2). In cases where the input has a spatiotemporal character (e.g., video image sequences), the input units may be arranged in a particular spatial fashion ("input retina") and connected to the DR in a topology-preserving way. Details of how the weights of the input-to-DR units are determined, are given in the "detailed description of preferred embodiments" section.

Alternatively, input values can be fed directly as additive components to the activations of the units of the DR, with or without spatial structuring.

Alternatively, the input values can be coded before they are presented to the DR. For instance, spatial coding of numerical values can be employed.

Reading Out Output

According to another architectural aspect of the invention, m-dimensional output y(t) at time t is obtained from the DR by reading it out from the activations of m output units (where m≧1). By convention, the activations of the output units shall be denoted by $y_1(t), \ldots, y_m(t)$.

In a preferred embodiment of the invention, these output units are attached to the DR as extra units. In this case (i.e., extra output units), there may also be provided output-to-DR connections which feed back output unit activations into the DR network. Typically, no such feedback will be provided when the network is used as a passive device for signal processing (e.g., for pattern classification or for filtering). Typically, feedback connections will be provided when the network is used as an active signal generation device. Details of how to determine feedback weights are described in the "detailed description of preferred embodiments" section.

According to another architectural aspect of the invention, the activation update method for the m outputs $y_1(t), \ldots, y_m(t)$ is of the form given in equation (1), with transfer functions $f_1, \ldots, f_m$. The transfer functions $f_j$ of output units typically will be chosen as sigmoids or as linear functions.

FIG. 1 provides an overview of a preferred embodiment of the invention, with extra input and output units. In this figure, the DR [1] is receiving input by means of extra input units [2] which feed input into the DR through input-to-DR connections [4]. Output is read out of the network by means of extra output units [3], which in the example of FIG. 1 also have output-to-DR feedback connections [7]. Input-to-DR connections [4] and output-to-DR feedback connections [7] are fixed and not changed by training. Finally, there are DR-to-output connections [5] and [possibly, but not necessarily] input-to-output connections [6]. The weights of these connections [5], [6] are adjusted during training.

Next, the procedural aspects of the invention (teaching method) are related. As with all supervised teaching methods for RNNs, it is assumed that a training sequence is given. The training sequence consists of two time series u(t) and ỹ(t), where t=1,2, ..., N. It is tacitly understood that in cases of online learning, N need not be determined at the outset of the learning; the learning procedure is then an open-ended adaptation process. u(t) is an n-dimensional input vector (where n≧0 i.e., the no-input case n=0 is also possible), and ỹ(t) is an m-dimensional output vector (with m≧1). The two time series u(t) and ỹ(t) represent the desired, to-be-learnt input-output behavior. As a special case, the input sequence u(t) may be absent; the learning task is then to learn a purely generative dynamics.

The training sequences u(t), ỹ(t) are presented to the network for t=1,2, ..., N. At every time step, the DR is updated (according to the chosen update law, e.g., Equation (1)), and the activations of the output units are set to the teacher signal ỹ(t) (teacher forcing).

The method of the invention can be accommodated off-line learning and on-line learning.

In off-line learning, both the activation vector x(t) of non-output-units and the teacher signal ỹ(t) are collected for t=1,2, ..., N. From these data, at time N there are calculated weights $w_{ji}$ for connections leading into the output units, such that the mean square error $$E[\varepsilon_j^2] = \frac{1}{N-1} \sum_{t=1}^{N-1} (f_j^{-1}(\tilde{y}_j(t+1)) - \langle w_j, x(t) \rangle)^2 \qquad (4)$$

Index j nach f-1 is minimized for every output unit j=1, ..., m over the training sequence data In equation (4), $\langle w_j, x(t) \rangle$ denotes the inner product $$w_{j1}u_1(t) + \ldots + w_{jn}u_n(t) + w_{j,n+1}x_1(t) + \ldots + w_{j,n+K}x_K(t) + w_{j,n+K+1}y_1(t) + \ldots + w_{j,n+K+m}y_m(t), \qquad (5)$$

this form of $\langle w_j, x(t) \rangle$ being given if there are extra input units. The calculation of weights which minimize Eq. (4) is a standard problem of linear regression, and can be done with any of the well-known solution methods for this problem. Details are given in the Section "Detailed description of preferred embodiments".

The weights $w_{ji}$ are the final result of the procedural part of the method of the invention. After setting these weights in the connections that feed into the output units, the network can be exploited.

In online-learning variants of the invention, the weights $w_j$ are incrementally adapted. More precisely, for j=1, ..., m, the weights $w_j(t)$ are updated at every time $t_0$=1,2, ..., N by a suitable application of any of the many well-known methods that adaptively and incrementally minimize the mean square error up to time $t_0$, $$E[\varepsilon_j^2(t_0)] = \frac{1}{t_0-1} \sum_{t=1}^{t_0-1} (f^{-1}(\tilde{y}_j(t+1)) - \langle w_j, x(t) \rangle)^2. \qquad (4a)$$

Adaptive methods that minimize this kind of error are known collectively under the name of "recursive least squares" (RLS) methods. Alternatively, from a statistical perspective one can also minimize the statistically expected square error $$E[\varepsilon_j^2] = E[f^{-1}(\tilde{y}_j(t+1)) - \langle w_j, x(t) \rangle], \qquad (4b)$$

where on the right-hand side E denotes statistical expectation. Adaptive methods that minimize (4b) are stochastic gradient descent methods, of which there are many, among them Newton's method and the most popular of all MSE minimization methods, the LMS method. However, the LMS method is not ideally suited to be used with the method of the invention. Details are given in the Section "Detailed description of preferred embodiments".

BRIEF DESCRIPTION OF THE FIGURES

The provided Figures are, with the exception of FIG. 1, illustrations of the examples described below. They are referenced in detail in the description of the examples. Here is an overview of the Figures.

DESCRIPTION OF SOME EXAMPLES

Before the invention is described in detail in subsequent sections, it will be helpful to demonstrate the invention with some exemplary embodiments. The examples are selected to highlight different basic aspects of the invention.

Example 1

A Toy Example to Illustrate Some Basic Aspects of the Invention

This example demonstrates the basic aspects of the invention with a toy example. The task is to teach a RNN to generate a sine wave signal. Since this task is almost trivial, the size of the DR was selected to be only 20 units (for more interesting tasks, network sizes should be significantly greater).

First, it is shown how the network architecture was set up. The 20 units were randomly connected with a connectivity of 20%, i.e., on average every unit had connections with 4 other units (including possible self-connections). The connection weights were set randomly to either 0.5 or −0.5.

Figure 2:
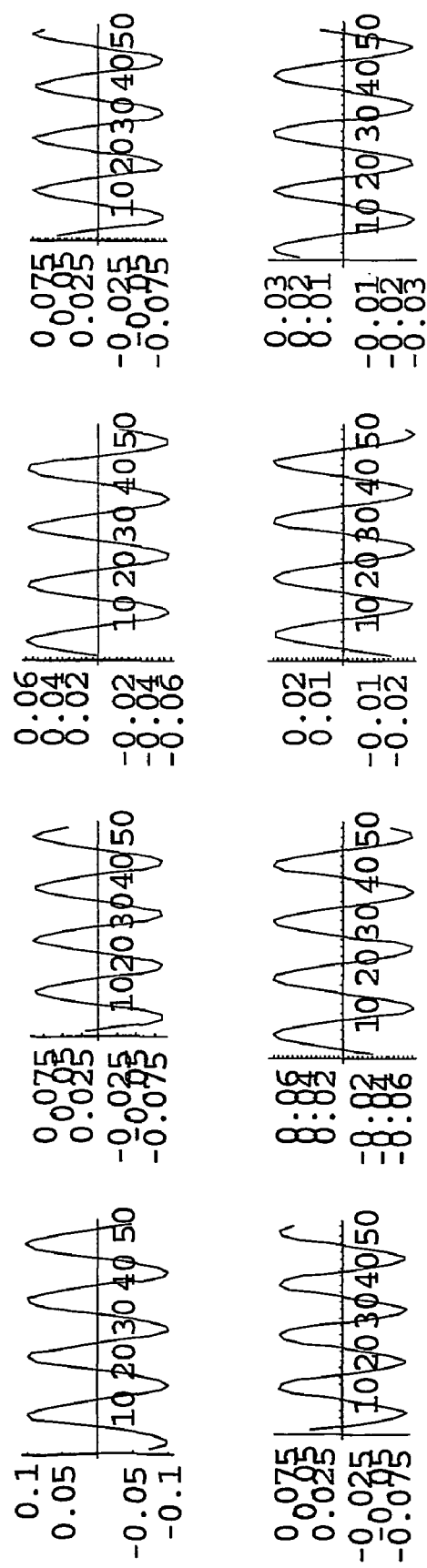
FIG. 2 shows various data sets obtained from the first example, a simplistic application of the method of the invention to obtain a Sine generator network, which is reported for didactic reasons.
Figure 2:
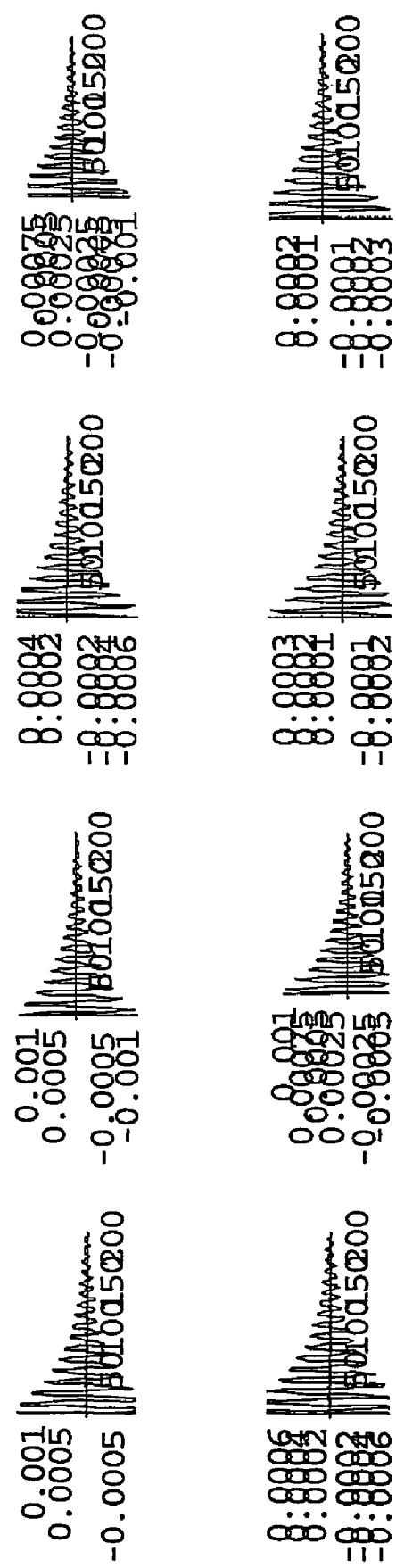
Figure 2:
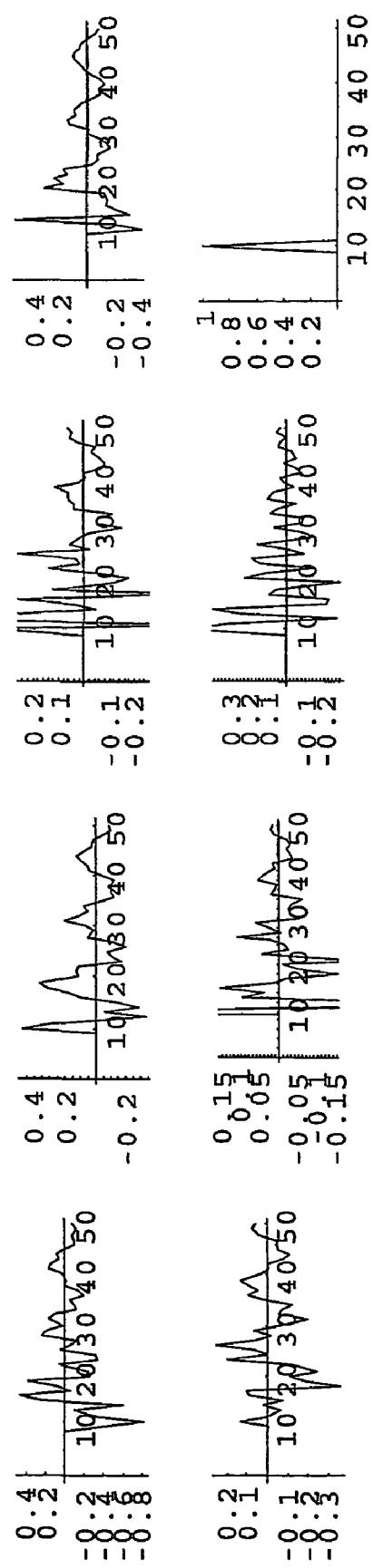

This network was left running freely. FIG. 2a shows a trace of 8 arbitrarily selected units in the asymptotic activity. It is apparent that all DR units are entrained a low-amplitude oscillation.

According to the architectural aspects of the invention, an autonomous self-excitation of the DR is not desired. The DR's autonomous dynamics should be globally stable, i.e., converge to a stable all-zero state from any initial starting state. Therefore, the weights were decreased by a factor of 0.98, i.e., a weight that was previously 0.5 was put to 0.49. FIG. 2b shows a 200 step trace obtained after 200 initial steps after starting the network in a random initial state. It is apparent that with the new weights the network's dynamics is globally stable, i.e. will asymptotically decay to all zero activations.

This global stability is only marginal in the sense that a slight increase of weights would render the dynamics unstable (in this case, oscillation would set in by an increase of absolute weight values from 0.49 to 0.5). A marginal global stability in this sense is often the desired condition for the setup of the DR according to the invention.

Next, the response characteristics of the DR is probed. To this end, an extra input unit was attached. It was completely connected to the DR, i.e., a connection was established from the input unit to every of the 20 units of the DR. The connection weights were set to values randomly taken from the interval [−2, 2]. FIG. 2c shows the response of the network to a unit impulse signal given at time t=10. The first seven plots in FIG. 2c show activation traces of arbitrarily selected DR units. The last plot shows the input signal. It becomes apparent that the DR units show a rich variety of response dynamics. This is the desired condition for the setup of DRs according to the invention.

Figure 2D:
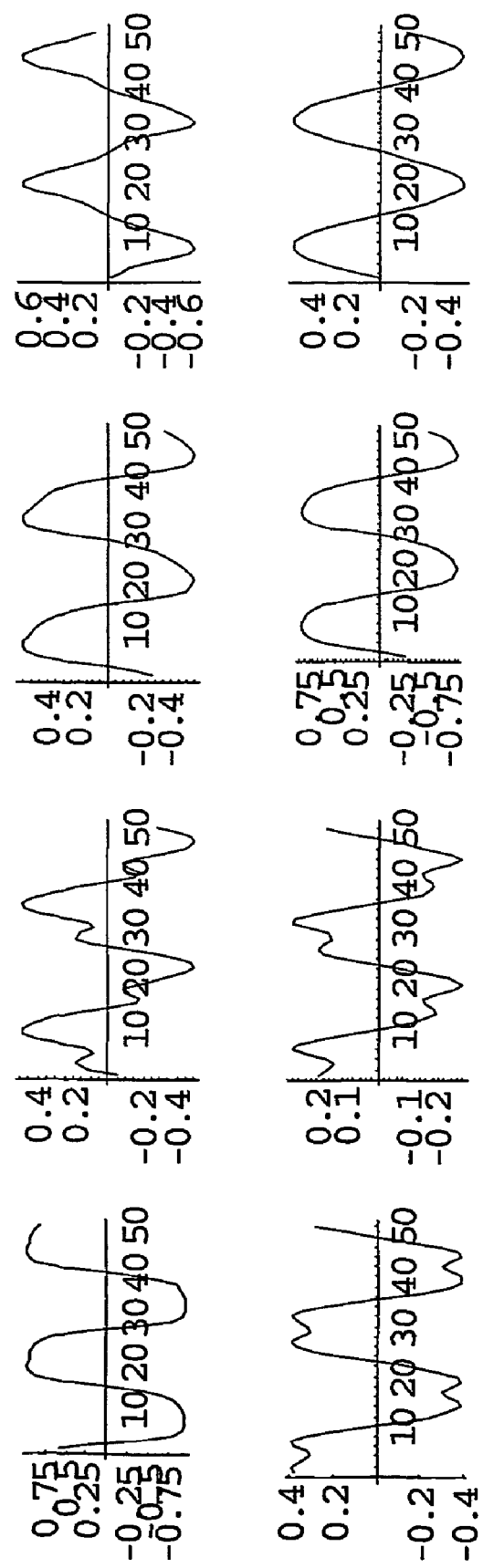
Figure 2:
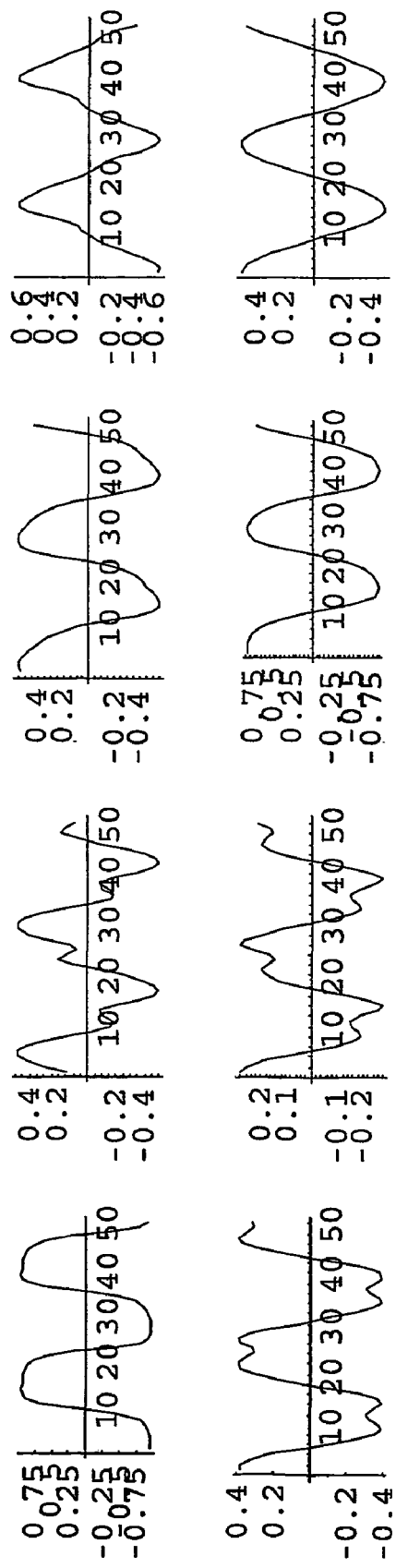
Figure 2:
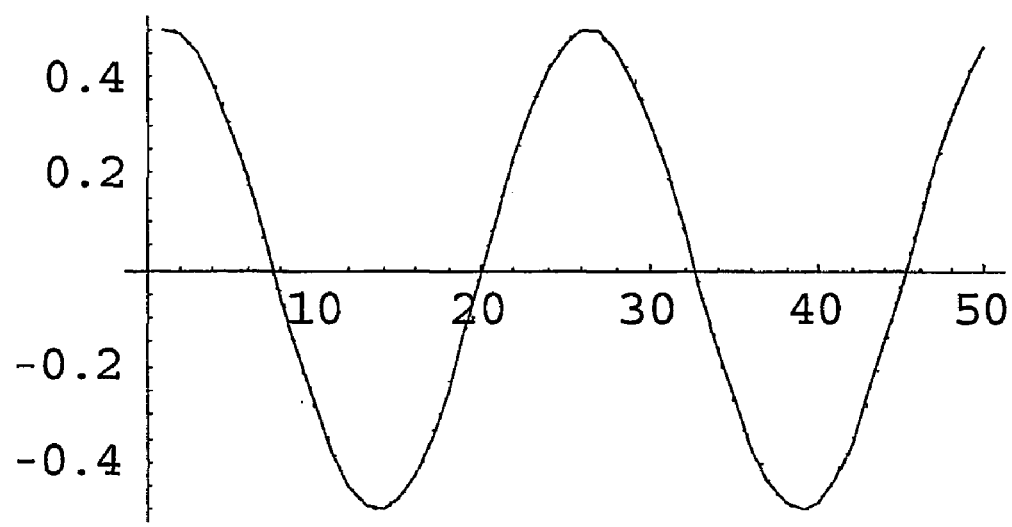

Next, the response of the DR network to a sine input was probed. Analogous to FIG. 2c, FIG. 2d shows the asymptotic response of seven DR units and the input signal. This Figure again emphasizes the rich variety of responses of DR units. Finally, the network was trained to generate the same sine signal that was administered previously as input. The extra unit that was previously used as input unit was left unchanged in its connections to the DR, but now was used as an output unit. Starting from an all zero activation, the network was first run for 100 steps with teacher forcing to settle initial transients. The, it was run another 500 steps with teacher forcing. The activation values of the 20 DR units were recorded for these 500 steps. At time t=600, an offline learning of weights from the DR to the output unit was performed, i.e., the DR-to-output weights were computed as the solutions of a linear regression of the desired output values to the DR states, minimizing the mean square error of Equation (4). Thereafter, teacher forcing was switched off, and the network was left run freely for another 10,000 steps. After that, 50 steps were plotted to obtain FIG. 2e. Here, the eighth plot shows the activation of the output unit. Unsurprisingly, FIG. 2e is virtually the same as FIG. 2d. FIG. 2f shows a superposition of the output with the teacher (but unknown to the network) signal:teacher signal=solid line, network output=dashed line. The dashed is identical to the solid line at the plotting resolution; in fact, the numerical value of the mean square error (4) was $1.03 \times 10^{-13}$ for this (simple) learning task.

Example 2

A Short Time Memory

In this example it is shown how the method of the invention can be used to teach an RNN to produce delayed versions of the input.

Figure 1:
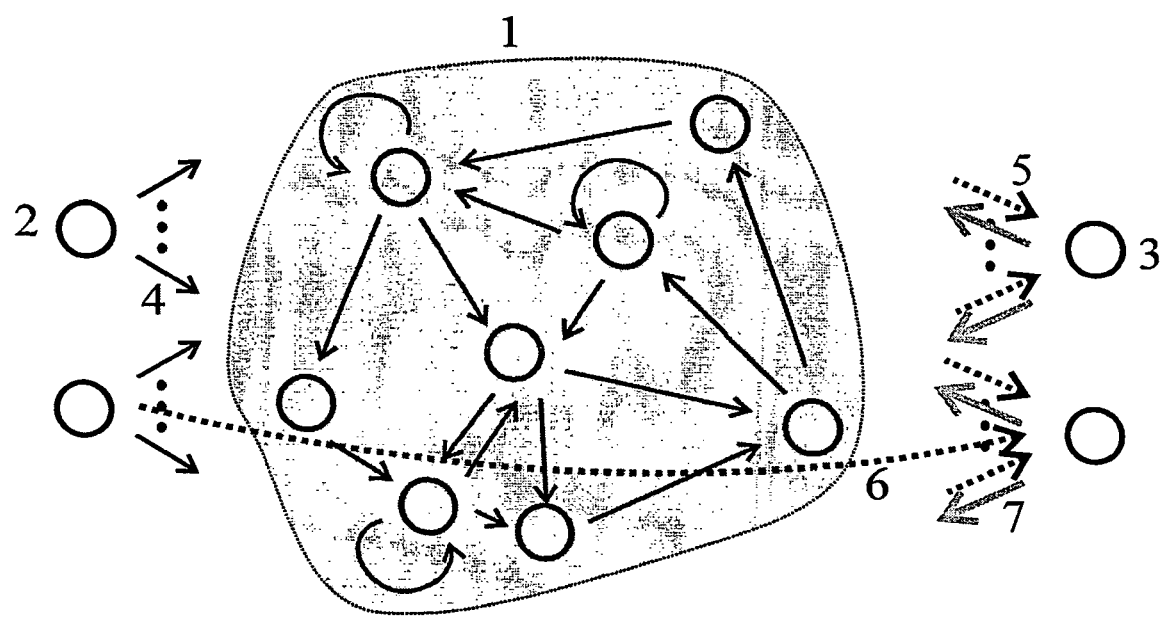
FIG. 1 is a simplified overview of a preferred embodiment of the invention.

The network was set up as in FIG. 1. The DR had a size of 100 units. It was randomly connected with a connectivity of 5%. Nonzero weights were set to +0.45 or −0.45 with equal probability. This resulted in a globally stable dynamics of the DR (again, of marginal stability: increasing absolute values of weights to 0.475 would destroy global stability). The impulse response of the DR's units to a unit impulse were qualitatively similar to the ones in example 1 (cf. FIG. 2c) and are not shown.

One input unit was attached to the DR, by connecting the input unit to every unit of the DR. Weights of these connections were randomly set to 0.001 or −0.001 with equal probability.

Furthermore, three extra output units were provided, with no output-to-DR feedback connections.

Figure 3:
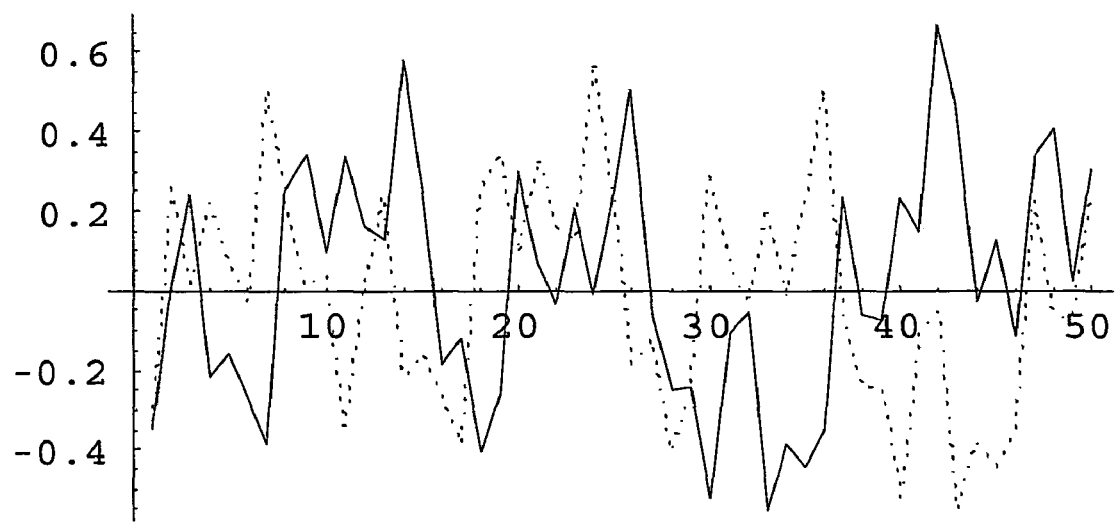
FIG. 3 shows various data sets obtained from the second example, an application of the method of the invention to obtain a short time memory network in the form of a delay line.
Figure 3:
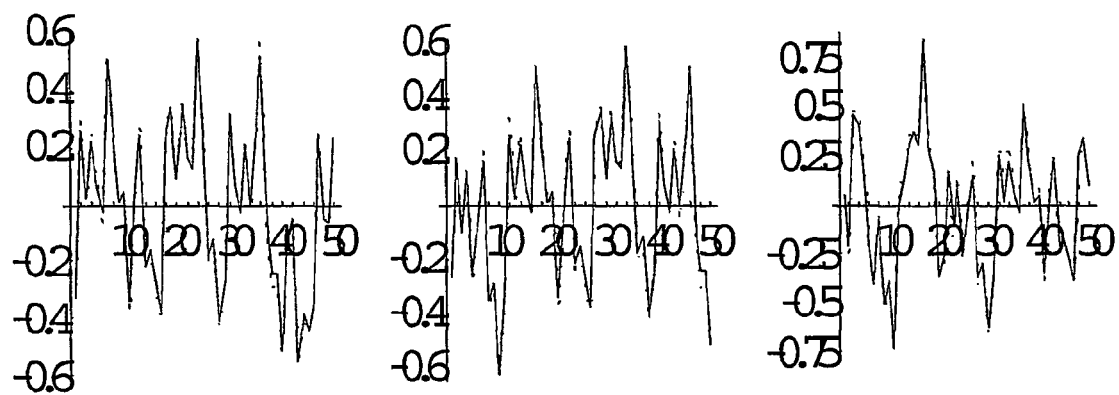

The learning task consisted in repeating in the output node the input signal with delays of 10, 20, 40 time steps. The input signal used was essentially a random walk with a banded, nonstationary frequency spectrum. FIG. 3a shows a 50-step sequence of the input (solid line) and the correct delayed signal (teacher signal) of delay 10 (dashed line).

The network state was randomly initialized. The input was then presented to the network for 700 update steps. Data from the first 200 update steps were discarded to get rid of initial transient effects. Data from the remaining 500 update steps were collected and used with the off-line embodiment of the learning method of the invention. The result were weights for the connections from DR and input units to output units. The network run was continued with the learnt weights for another 150 update steps. The input and outputs of the last 50 update steps are plotted in FIG. 3(b). The three plots show the correct delayed signal (solid) superimposed on the outputs generated by the learnt network (dashed). It becomes apparent that the network has successfully learnt to delay a signal even for as long as 40 time steps.

In order to quantify the precision of the learnt network output, the mean square error of each of the three output units was calculated from a sample sequence. They were found to be 0.0012, 0.0013, 0.0027 for the delays of 10, 20, 40, respectively.

Comment. The challenge of this learning task is that the network has to serve as a temporal memory. This goal is served by two aspects of the setup of the network for learning. First, the autonomous dynamics of the DR was tuned such that it was globally stable only by a small margin. The effect is that dynamic aftereffects of input die out slowly, which enhances the temporal memory depth. Second, the input-to-DR connections had very small weights. The effect was that the ongoing (memory-serving) activation within the DR net is only weakly modulated, such that memory-relevant "repercussions" are not too greatly disturbed by incoming input.

Example 3

Learning an Excitable Medium

In this example it is demonstrated how the method of the invention can be used to train a 2-dimensional network to support the dynamics of an excitable medium.

Figure 4:
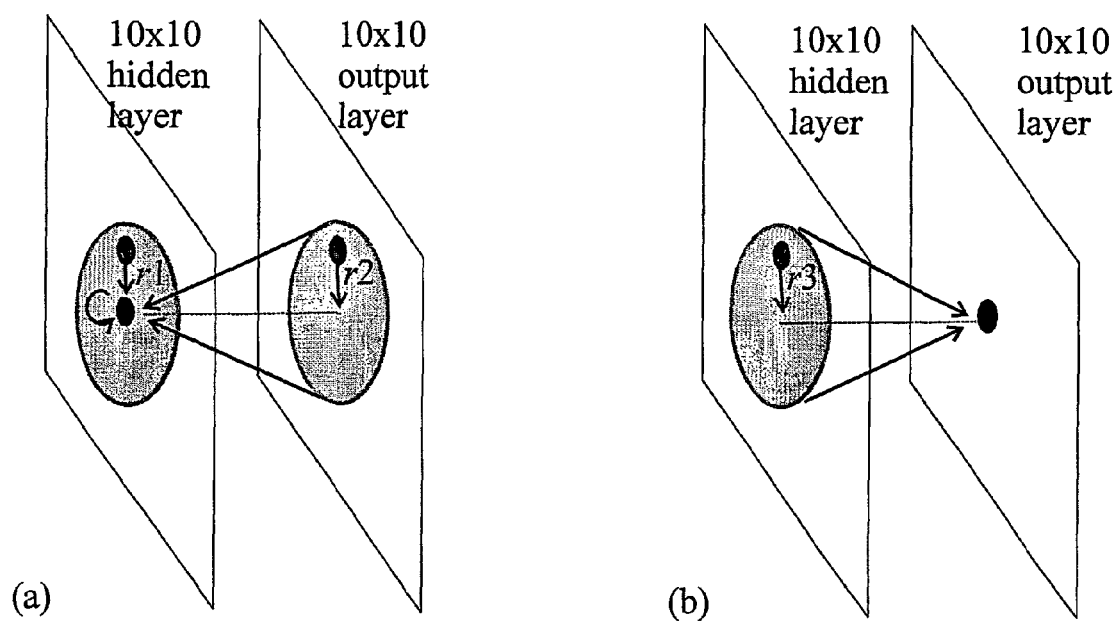
FIG. 4 shows the connectivity setup and various data sets obtained from the third example, an application of the method of the invention to obtain a model of an excitable medium trained from a single "soliton" teacher signal.
Figure 4:
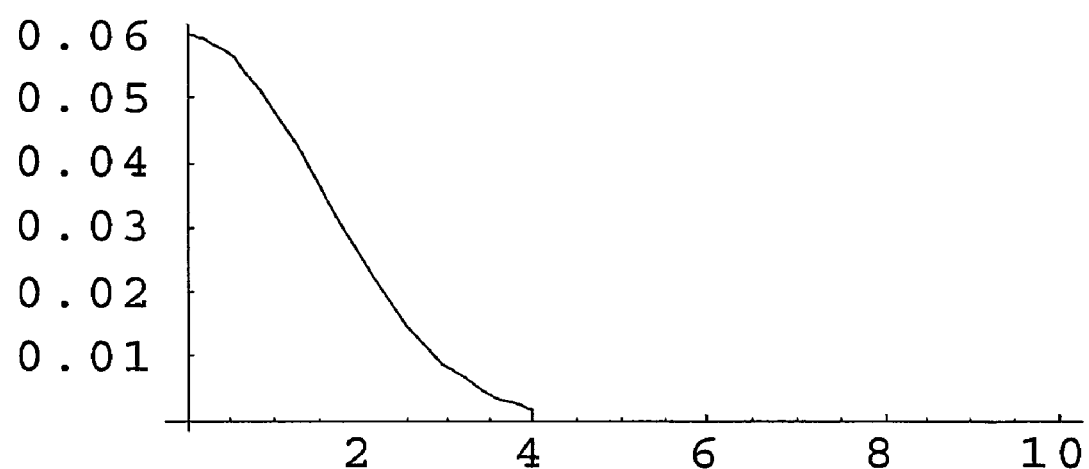
Figure 4:
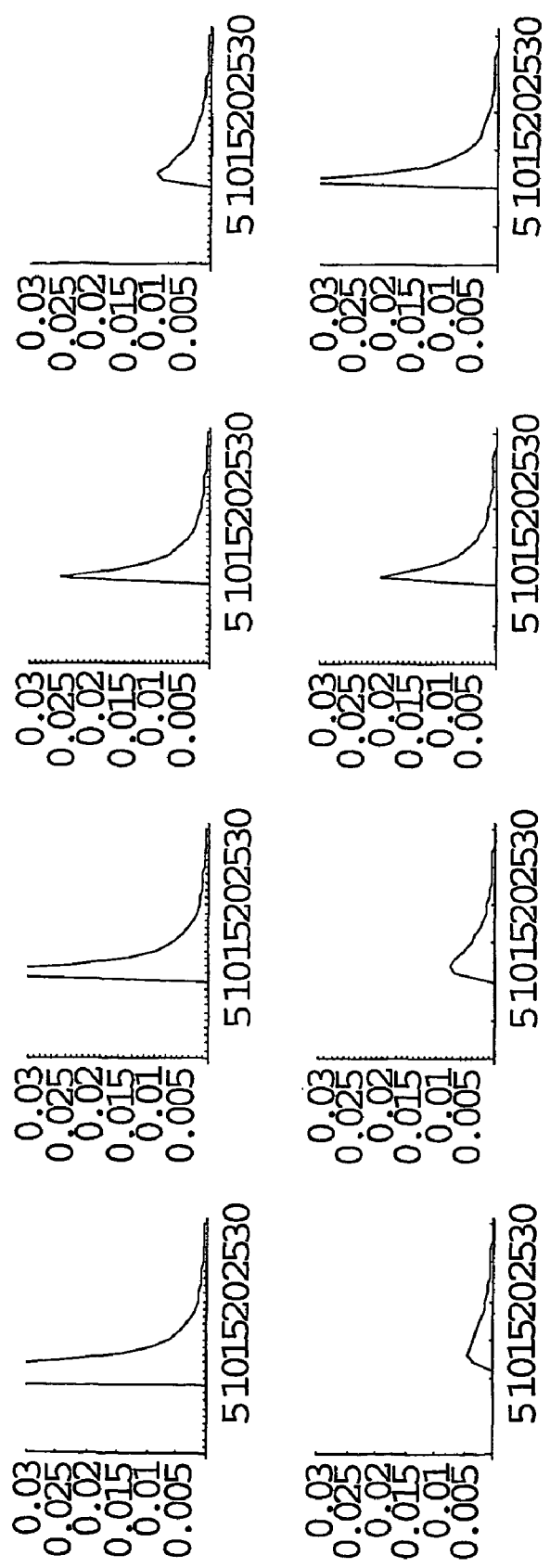
Figure 4:
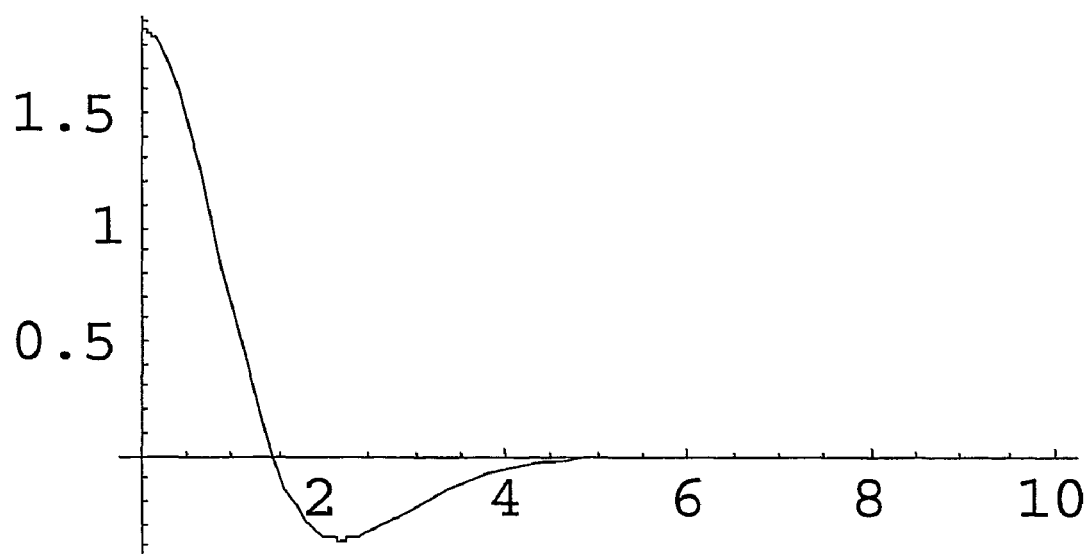
Figure 4:
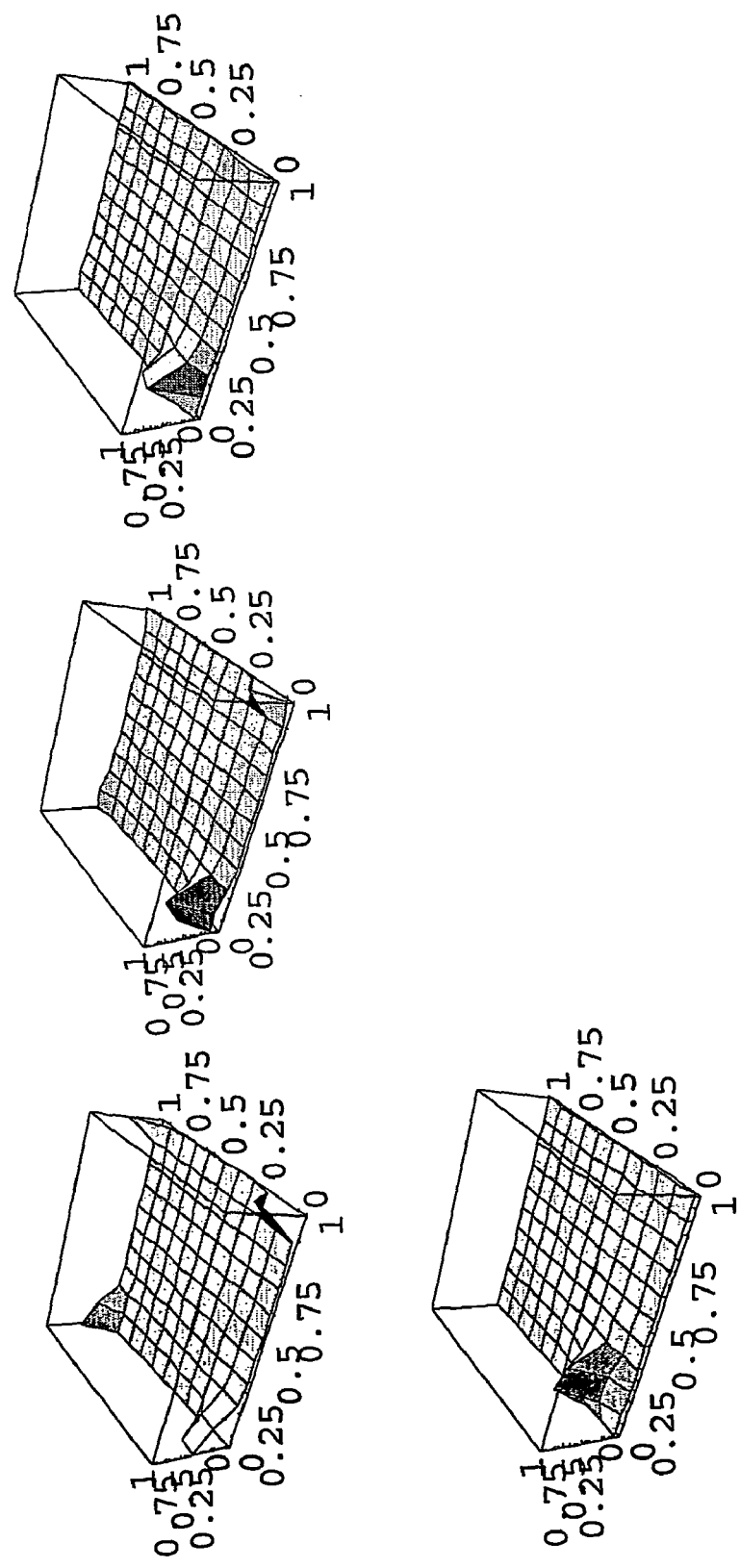
Figure 4:
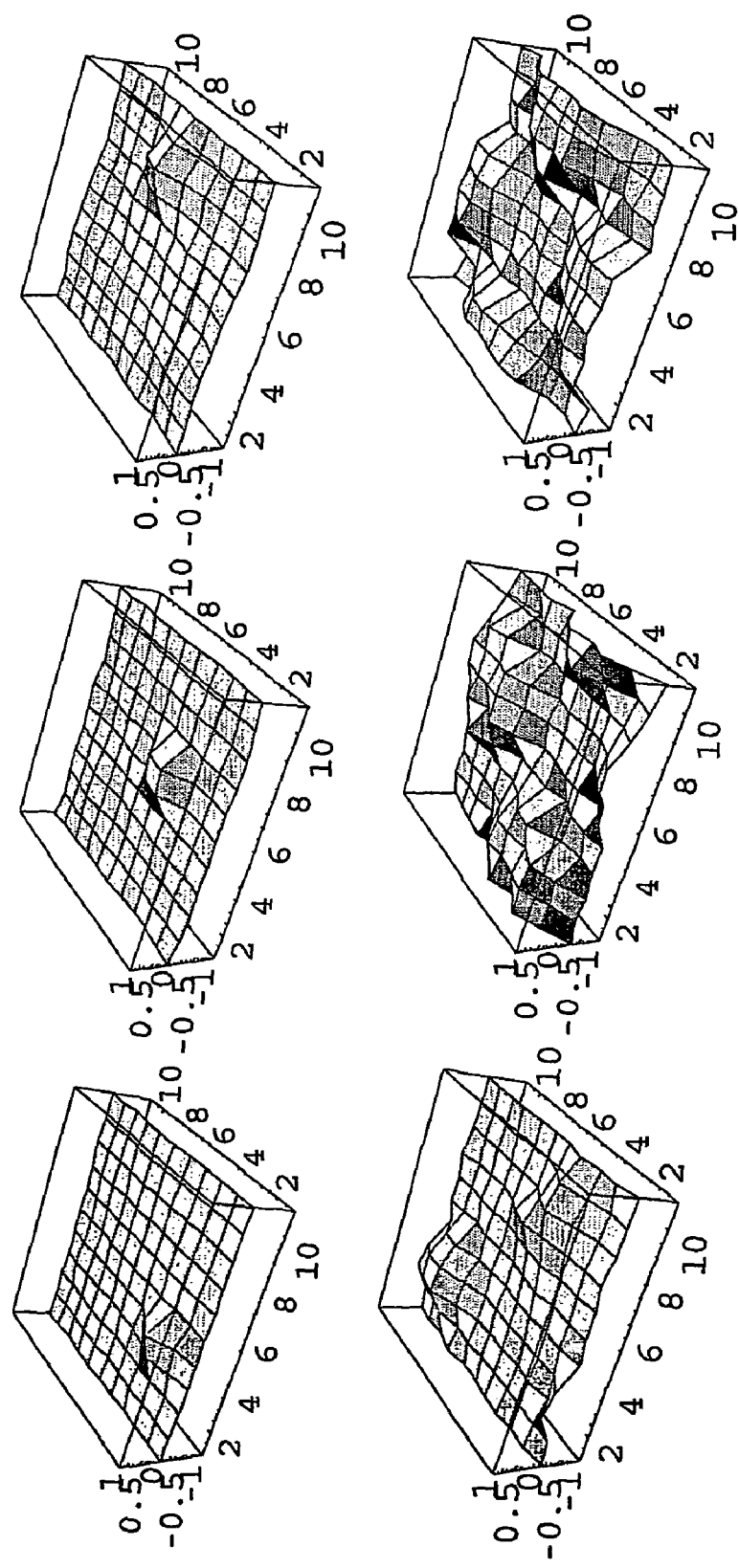
Figure 4:
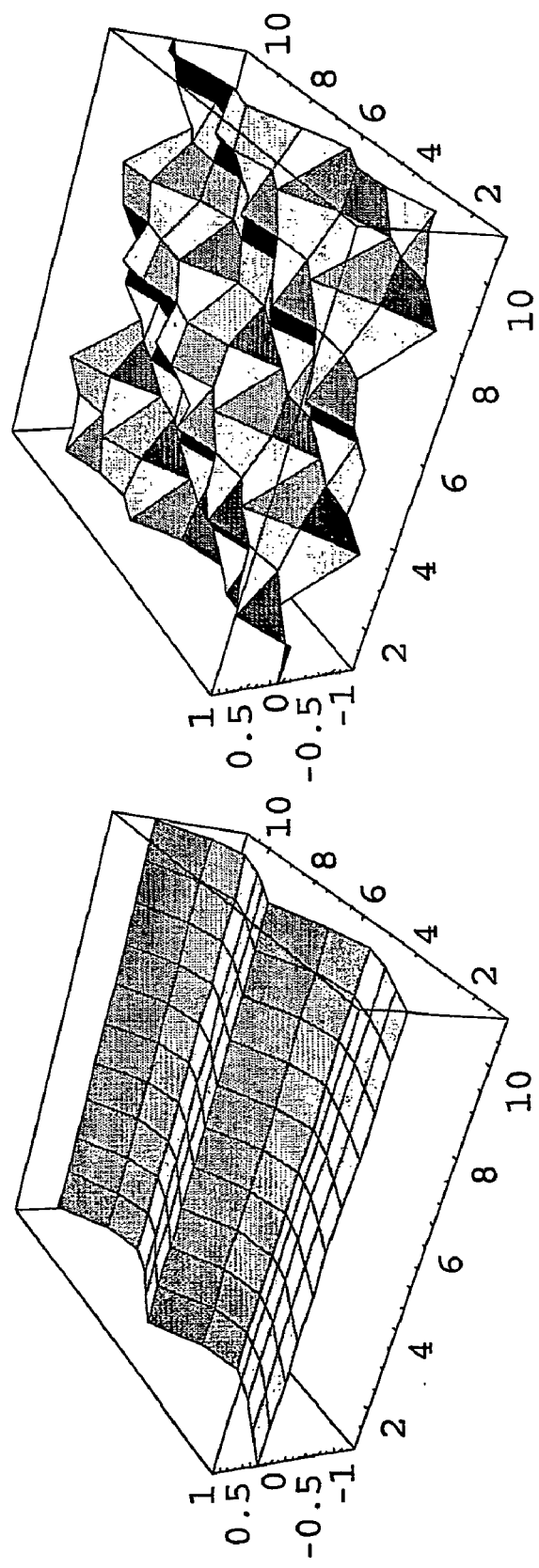

The network was set up as in FIGS. 4a,b. It consisted of two layers of 100 units, which were each arranged in a 10×10 grid. To avoid dealing with boundary conditions, the grid was topologically closed into a torus. The first layer was used as the DR, the second layer was the output layer.

A local connectivity pattern was provided, as follows. Each unit of the first layer received connections from locally surrounding units within that layer (FIG. 4a). The weights were set depending on the distance r1 between units, as shown in FIG. 4c. The resulting internal DR dynamics is depicted in FIG. 4d, which shows the response of 8 arbitrarily selected units of the first layer to a unit impulse fed into the first unit at timestep 10. It can be seen that the DR dynamics dies out, i.e., it is globally stable.

Each unit of the first layer additionally received connections from output units that lied in a local neighborhood of radius r2. The dependency of weights from distance r2 is shown in FIG. 4e.

Among all possible connections from the DR to a particular output unit, only the ones within a grid distance r3 was less or equal to 4 (FIG. 4b) had to be trained. The goal of learning was to obtain weights for these DR-to-output connections.

No input was involved in this learning task.

The teaching signal consisted in a "soliton" wave which was teacher-forced on the output layer. The soliton slowly wandered with constant speed and direction across the torus. FIG. 4f shows four successive time steps of the teacher signal. Note the effects of torus topology in the first snapshot.

The teaching proceeded as follows. The DR network state was initialized to all zeros. The network was then run for 60 time steps. The DR units were updated according to Equation (1), with a sigmoid transfer function $f$=tanh. The output units were updated by teacher forcing, i.e., the teacher signal shown in FIG. 4f was written into the output units. Data from the first 30 time steps were discarded, and the data collected from the remaining 30 time steps were used for the off-line embodiment of the learning method of the invention. The result were weights for the connections from DR units to output units. A speciality of this learning task is that the result of the teaching should be spatially homogeneous, i.e., all output units should be equipped with the same set of weights. This allowed that the data obtained from all 100 output units could be pooled for the learning method of the invention, i.e. a training sample of effectively 100×30=3000 pairings of network states and desired outputs were used to calculate the desired weight set.

To get an impression of what the network has learnt, several demonstration runs were performed with the trained network.

In the first demonstration, the network was teacher-forced with the soliton teacher for an initial period of 10 time steps. Then the teacher forcing was switched off and the network was left running freely for 100 further steps. FIG. 4g shows snapshots taken at time steps 1, 5, 10, 20, 50, 100 from this free run. The initially forced soliton persists for some time, but then the overall dynamics reorganizes into a stable, symmetric pattern of two larger solitons that wander across the torus with the same speed and direction as the training soliton.

In other demonstrations, the network was run from randomized initial states without initial teacher forcing. After some time (typically less than 50 time steps), globally organized, stable patterns of travelling waves emerged. FIG. 4h shows a smooth and a rippled wave pattern that emerged in this way.

Comment. This example highlights how the method of the invention applies to spatial dynamics. The learning task actually is restricted to a single output unit; the learnt weights are copied to all other output units due to the spatial homogeneity condition that was imposed on the system in this example. The role of the DR is taken by the hidden layer, whose weights in this case were not given randomly (as in the previous examples) but were designed according to FIG. 4c.

Example 4

Learning a Chaotic Oscillator: the Lorenz Attractor

In this example it is shown how the method of the invention can be used for the online-learning of a chaotic oscillator, in the presence of noise in the teaching signal.

The network was set up with a randomly and sparsely connected DR (80 units, connectivity 0.1, weights +0.4 or −0.4 with equal probability) and a single output unit (output-to-DR feedback connections with full connectivity, random weights drawn from uniform distribution over [−2, 2]). The update rule was a "leaky integration" variant of Eq. (1), which uses a "potential" variable v to mix earlier states with the current state:

$$x_j(t+1) = f(v_j(t+1)) \tag{6}$$
$$v_j(t+1) = (1-a_j)\left(\sum_{i=1,\ldots,N} w_{ji}x_i(t)\right) + a_j v_j(t)$$

A transfer function $f$=tanh was used. The leaking coefficients $a_j$ were chosen randomly from a uniform distribution over [0, 0.2].

As in the previous examples, this setup resulted in an RNN with marginal global stability and a rich variety in impulse responses of the individual units.

Figure 5:
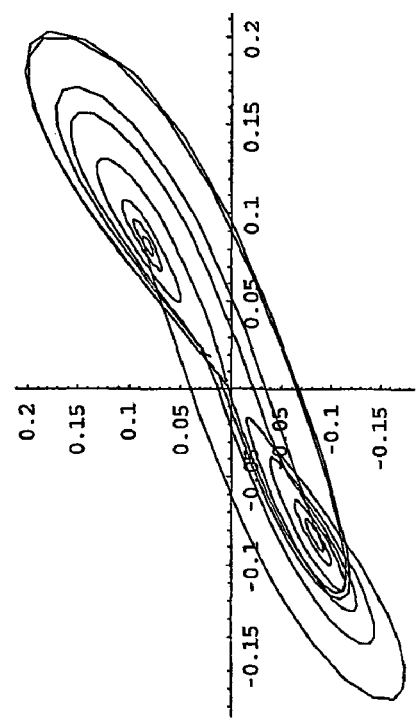
FIG. 5 shows various data sets obtained from the fourth example, an application of the method of the invention to learn a chaotic time series generator.
Figure 5:
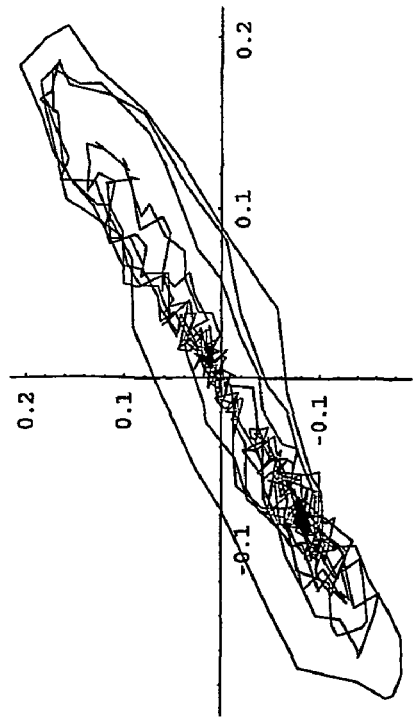
Figure 5:
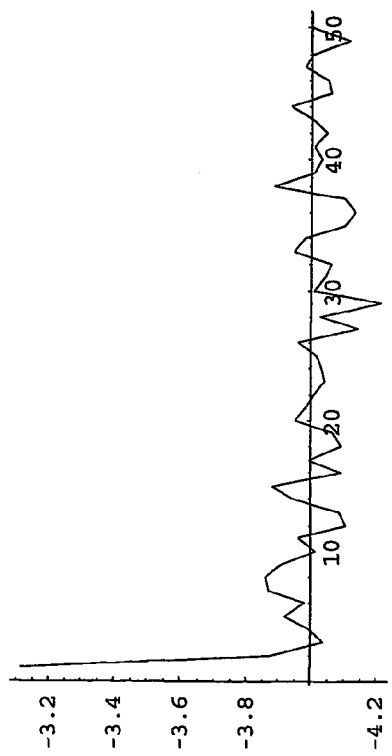
Figure 5:
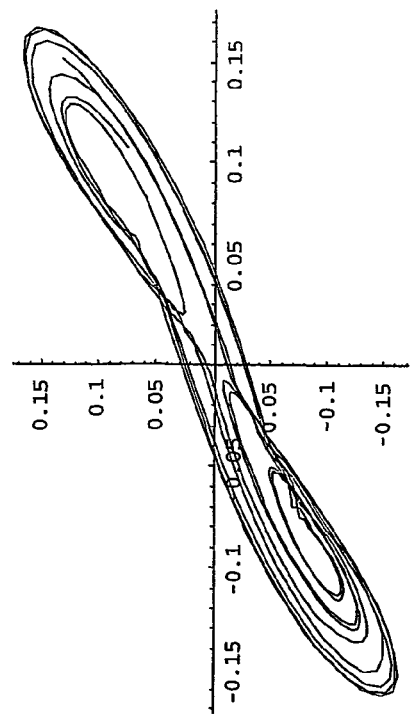
Figure 5:
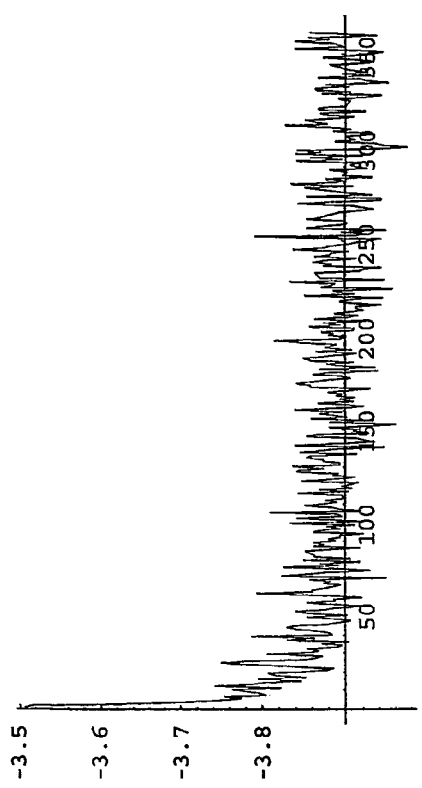
Figure 5:
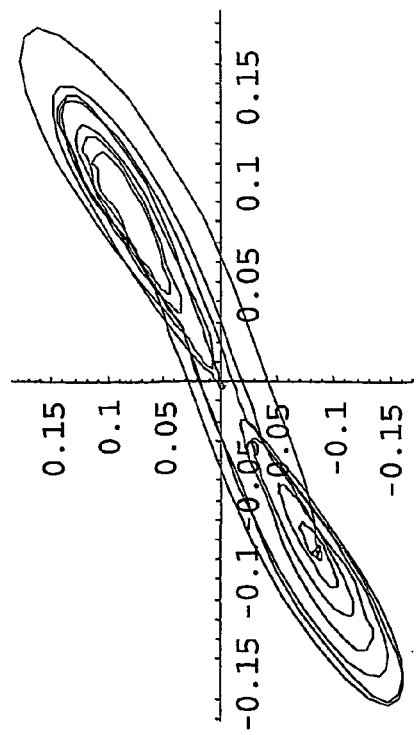
Figure 5:
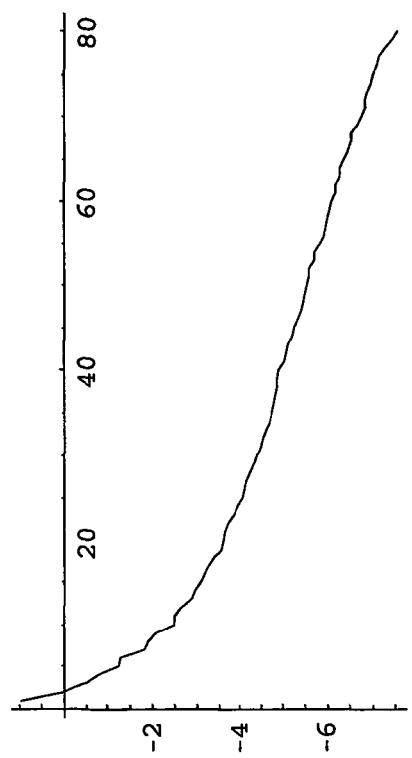
Figure 5:
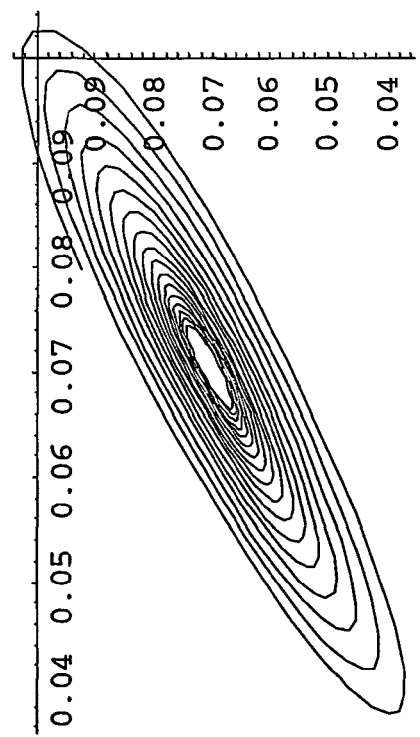

The 1-dimensional teaching signal was obtained by projecting the well-known 3-dimensional Lorenz attractor on its first dimension. A small amount of noise was added to the signal. A delay-embedding representation of the noisy teacher signal is shown in FIG. 5a, and of the teacher signal without noise in FIG. 5b. The learning task was to adapt the DR-to-output weights (using the noisy training signal) such that the neural network reproduced in its output unit dynamics the (noise-free) Lorenz trace.

The output weights were trained according to the method of the invention. For demonstration purposes, three variants are reported here: (a) offline learning, (b) online learning with the RLS method, (c) online learning with the LMS method.

Offline learning. The network state was initialized to all zero. The input was then presented to the network, and the correct teacher output was written into the three output nodes (teacher forcing) for 5100 update steps. Data from the first 100 update steps were. Data from the remaining 5000 update steps with teacher forcing were collected and used to determine DR-to-output weights with minimal MSE (Eq. (4)) with a linear regression computation. The MSE (4) incurred was 0.000089 (the theoretically possible minimum mean square error, stemming from the noise component in the signal, would be 0.000052). A time series generated by the trained is shown in FIG. 5c.

Online learning with the RLS method. The "recursive least squares" method can be implemented in many variants.

Here, the version from the textbook *B. Farhang-Boroujeny, Adaptive Filters: Theory and Applications*, Wiley & Sons 1999, p. 423 was used. The same DR was used as in the offline learning version. The "forgetting rate" required by RLS was set to λ=0.9995. FIG. 5*d* shows the learning curve (development of $\log_{10}(\epsilon^2)$, low-pass filtered by averaging over 100 steps per plot point). The error converges to the final misadjustment level of approximately 0.000095 after about 1000 steps, which is slightly worse than in the offline trial. FIG. 5*e* shows a time series generated by the trained network.

Online learning with the LMS method. The least mean squares method is very popular due to its robustness and simplicity. However, as was already mentioned in the "Summary of the Invention", it is not ideal in connection with the method of the invention. The reason is that DR state vectors have large Eigenvalue spreads. Nevertheless, for illustration of this fact, the LMS method was carried out. The LMS method updates weights at every time step according to:

$$w_{ji}(t+1) = w_{ji}(t) + \mu \epsilon x_i(t), \quad (7)$$

where μ is a learning rate, j is the index of the output unit, $\epsilon = f^{-1}(\tilde{y}_j(t)) - f^{-1}(y_j(t))$ is the output unit state error, i.e. the difference between the (f-inverted) teacher signal $\tilde{y}_j(t)$ and the (f-inverted) output unit signal $y_j(t)$.

The network was adapted in five successive epochs with decreasing learning rates μ:1. μ=0.03, N=1000 steps, 2. μ=0.01, N=10.000, 3. μ=0.003, N=50.000, 4. μ=0.001, N=100.000, 5. μ=0.0003, N=200.000. At the end of the fifth epoch, a mean square error $E[\epsilon^2] \approx 0.000125$ was reached. FIG. 5*f* shows the learning curve (all epochs joined), and FIG. 5*g* shows a time series generated by the trained network. It is apparent that the trained network produces a point attractor instead of a chaotic attractor. This highlights the fact that the LMS method is ill-suited for training DR-to-output weights. A closer inspection of the Eigenvalue distribution of the covariance matrix of state vectors x(t) of the trained network reveals that the Eigenvalue spread is very high indeed: $\lambda_{max}/\lambda_{min} \approx 3 \times 10^8$. FIG. 5*h* gives a log plot of the Eigenvalues of this matrix. Eigenvalue distributions like this are commonly found in DRs which are prepared as sparsely connected, randomly weighted RNNs.

Example 5

A Direct/State Feedback Controller

In this example it is shown how the method of the invention can be used to obtain a state feedback neurocontroller for tracking control of a damped pendulum.

The pendulum was simulated in discrete time by the difference equation $$\omega(t+\delta) = \omega(t) + \delta(-k_1\omega(t) - k_2\sin(\phi(t)) + u(t) + v(t)) \; \phi(t+\delta)$$
$$= \phi(t) + \delta\omega(t) \quad (8)$$

where ω is the angular velocity, φ is the angle, δ is the timestep increment, u(t) is the control input (torque), and v(t) is uncontrolled noise input. The constants were set to $k_1=0.5$, $k_2=1.0$, δ=0.1, and the noise input was taken from a uniform distribution in [−0.02, 0.02].

Figure 6:
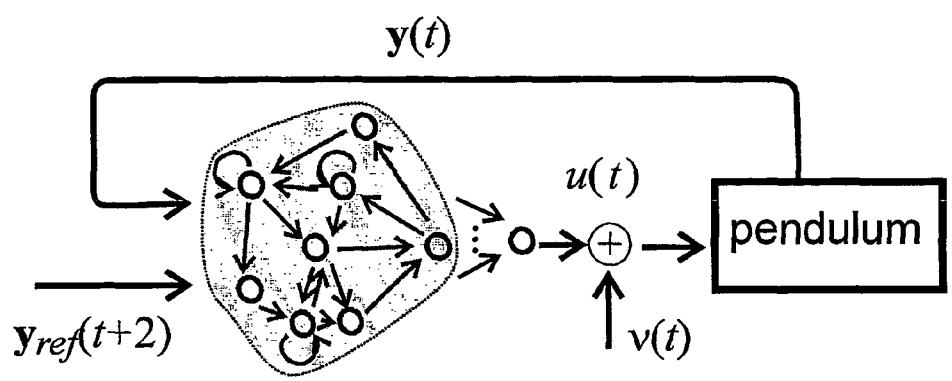
FIG. 6 illustrates the fifth example, by providing a schematic setup of a network applied to learning a state feedback tracking controller for a pendulum, and various data sets obtained in this example.
Figure 6:
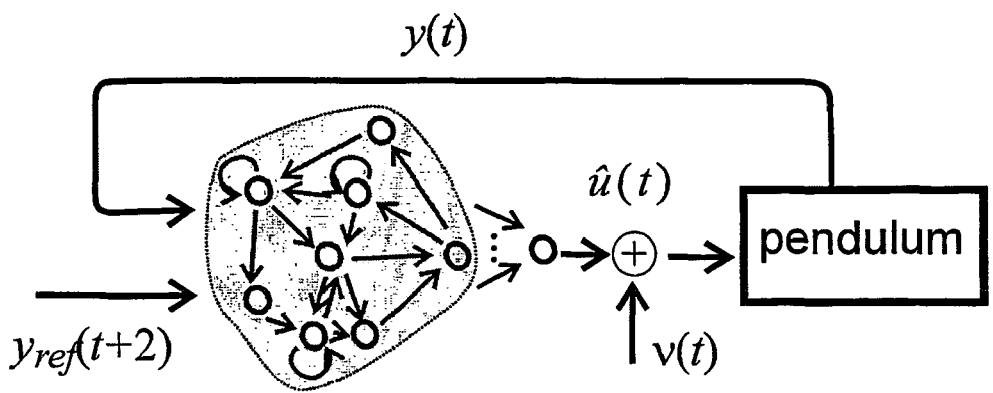
Figure 6:
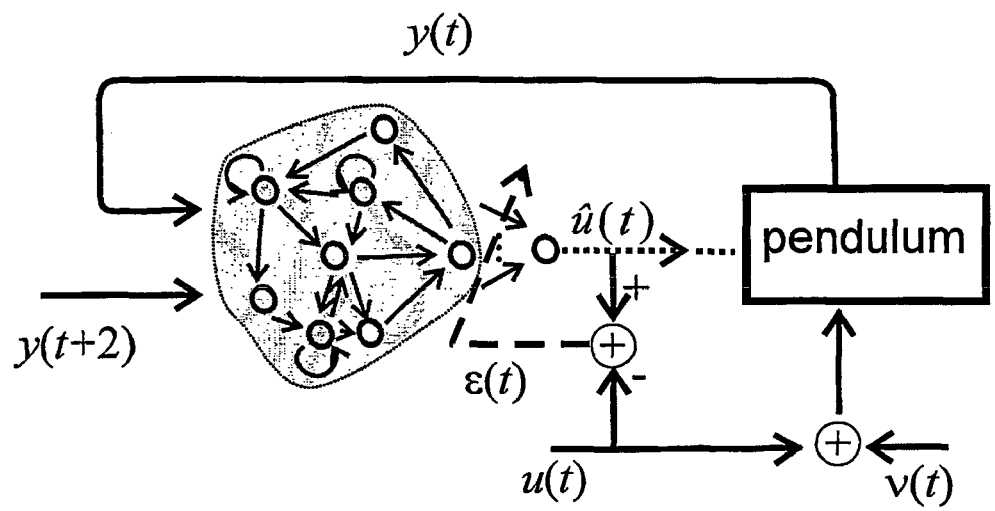
Figure 6:
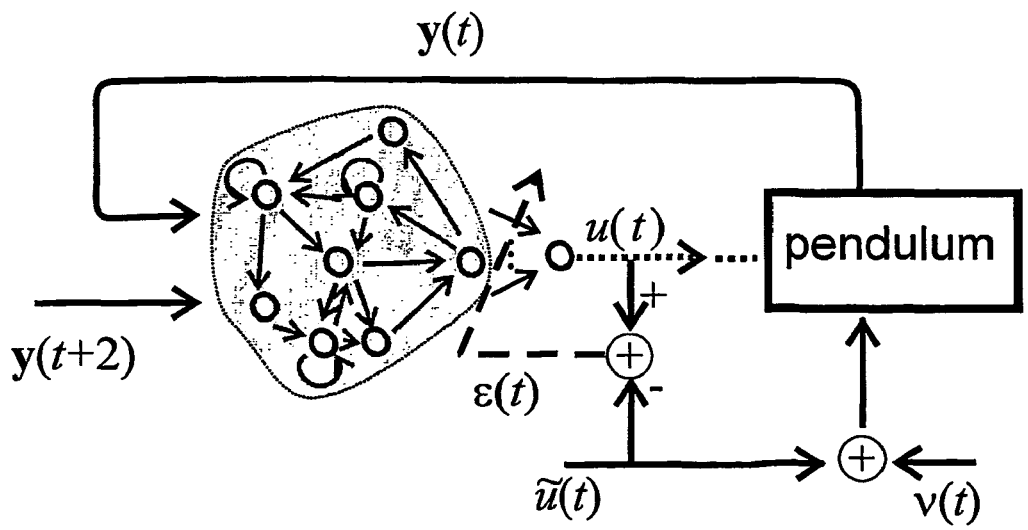
Figure 6:
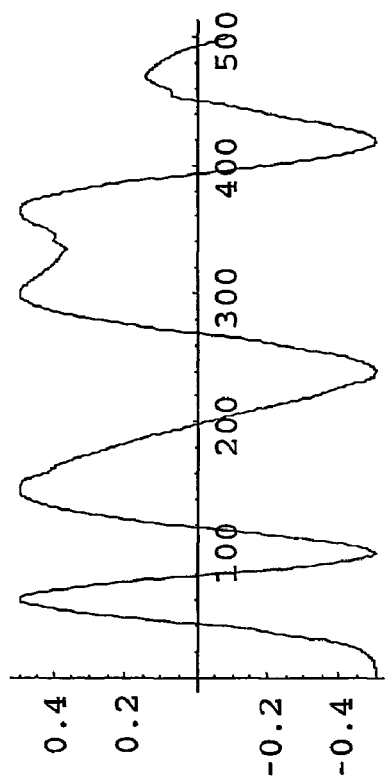
Figure 6:
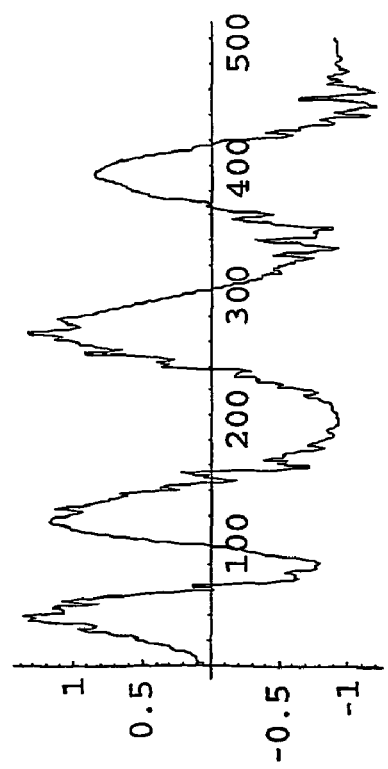
Figure 6:
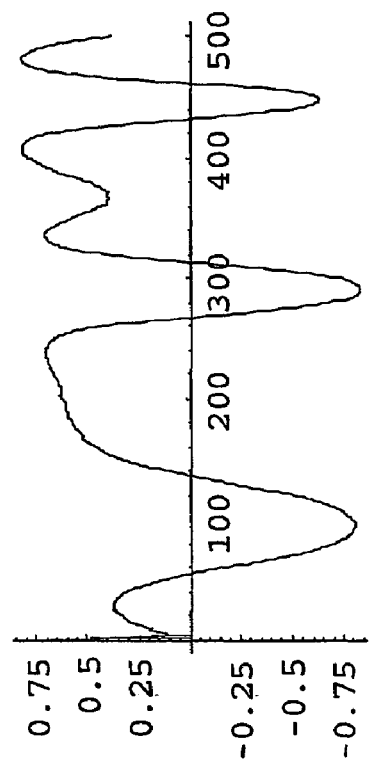
Figure 6:
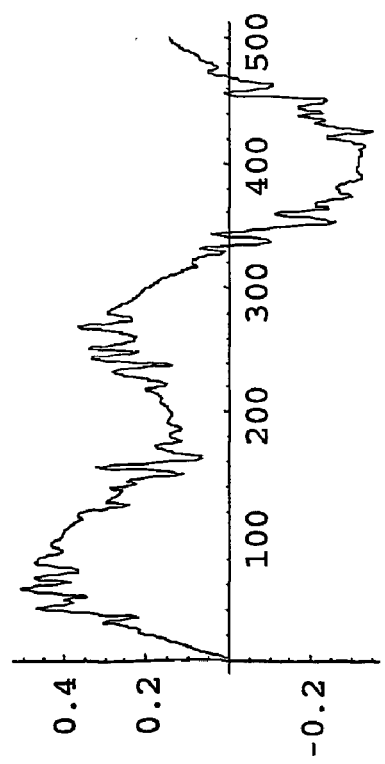
Figure 6:
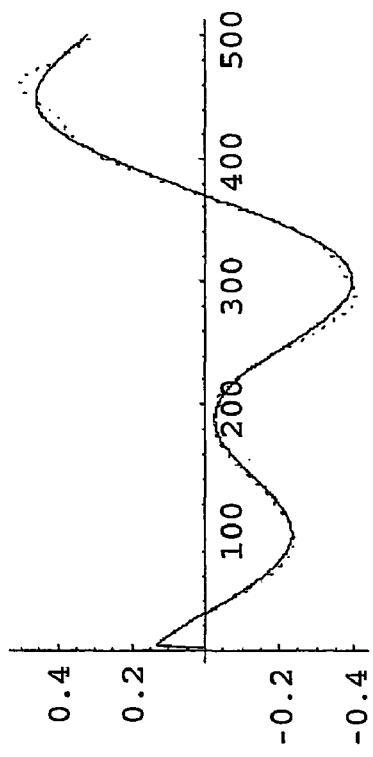
Figure 6:
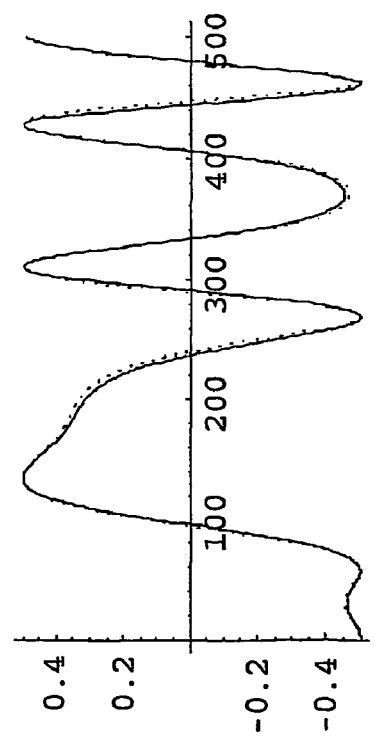

The task was to train a tracking controller for the pendulum. More specifically, the trained controller network receives a two-steps-ahead reference trajectory $y_{ref}(t+2\delta) = (x_{1ref}(t+2\delta), x_{2ref}(t+2\delta), \omega_{ref}(t+2\delta))$, where $x_{1ref}(t+2\delta), x_{2ref}(t+2\delta)$ are the desired position coordinates of the pendulum endpoint and $\omega_{ref}(t+2\delta)$ is the desired angular velocity. The length of the pendulum was 0.5, so $x_{1ref}(t+2), x_{2ref}(t+2)$ range in [−0.5,0.5]. Furthermore, the controller receives state feedback $y(t) = (x_1(t), x_2(t), \omega(t))$ of the current pendulum state. The controller has to generate a torque control input u(t) to the pendulum such that two update steps after the current time t the pendulum tracks the reference trajectory. FIG. 6*a* shows the setup of the controller in the exploitation phase.

For training, a 500-step long teacher signal was prepared by simulating the pendulum's response to a time-varying control input ũ(t), which was chosen as a superposition of two random banded signals, one with high frequencies and small amplitude, the other with low frequencies and high amplitude. FIG. 6*c* shows the control input ũ(t) used for the training signal, FIG. 6*d* shows the simulated pendulum's state answer $x_2(t)$ and FIG. 6*e* the state answer ω(t) (the state answer component $x_1(t)$ looks qualitatively like $x_2(t)$ and is not shown). The training signal for the network consisted of inputs $y(t) = (x_1(t), x_2(t), \omega(t))$ and $y(t+2\delta) = (x_1(t+2\delta), x_2(t+2\delta), \omega(t+2\delta))$; from these inputs, the network had to learn to generate as its output u(t)·u(t) stat\omega(t) FIG. 6*b* shows the training setup.

The network was set up with the same 100-unit DR as in the previous (Lorenz attractor) example. 6 external input units were sparsely (connectivity 20%) and randomly (weights +0.5, −0.5 with equal probability) attached to the DR, and one output unit was provided without feedback connections back to the DR. The network update rule was the standard noisy sigmoid update rule (1') for the internal DR units (noise homogeneously distributed in [−0.01, +0.01]). The output unit was updated with a version of Eq. (1) where the transfer function was the identity (i.e., a linear unit). The DR-to-output weights were computed by a simple linear regression such that the error $\epsilon(t) = \tilde{u}(t) - u(t)$ was minimized in the mean square sense over the training data set (N=500), as indicated in FIG. 6*b*.

In a test, the trained network was presented with a target trajectory $y_{ref}(t+2\delta) = (x_{1ref}(t+2\delta), x_{2ref}(t+2\delta), \omega_{ref}(t+2\delta))$ at the 3 units which in the training phase received the input $y(t+2\delta) = (x_1(t+2\delta), x_2(t+2\delta), \omega(t+2\delta))$. The network further received state feedback $y(t) = (x_1(t), X_2(t), CD(t))$ from the pendulum at the 3 units which received the signals $y(t) = (x_1(t), x_2(t), \omega(t))$ during training. The network generated a control signal u(t) which was fed into the simulated pendulum. FIG. 6*f* shows the network output u(t); FIG. 6*g* shows a superposition of the reference $x_{2ref}(t+2\delta)$ (solid line) with the 2-step-delayed pendulum trajectory $x_2(t+2\delta)$ (dashed line); FIG. 6*h* shows a superposition of the reference $\omega_{ref}(t+2\delta)$ (solid line) with the 2-step-delayed pendulum trajectory ω(t+2δ) (dashed line). The network has learnt to function as a tracking controller.

Discussion. The trained network operates as a dynamical state feedback tracking controller. Analytic design of perfect tracking controllers for the pendulum is not difficult if the system model (8) is known. The challenge in this example is to learn such a controller without apriori information from a small training data set.

The approach to obtain such a controller through training of a recurrent neural network ist novel and represents a dependent claim of the invention. More specifically, the claim is a method to obtain closed-loop tracking controllers by training of a recurrent neural network according to the method of the invention, where (1) the input training data consists of two vector-valued time series of the form $y(t+\Delta), y(t)$, where $y(t+\Delta)$ is a future version of the variables that will serve as a reference signal in the exploitation phase, and y(t) are state or observation feedback variables (not necessarily the same as in y(t+Δ)), (2) the output training data consists in a vector ũ(t), which is the control input presented to the plant in order to generate the training input data y(t+Δ),y(t).

Example 6

A Two-Way Device: Frequency Generator+Frequency Meter

In this example it is shown how the method of the invention can be used to obtain a device which can be used in two ways: as a tunable frequency generator (input: frequency target, output: oscillation of desired frequency) and as a frequency meter (input: oscillation, output: frequency indication). The network has two extra units, each of which can be used either as an input or as an output unit. During training, both units are treated formally as output units, in the sense that two teacher signals are presented simultaneously: the target frequency and an oscillation of that frequency.

Figure 7:
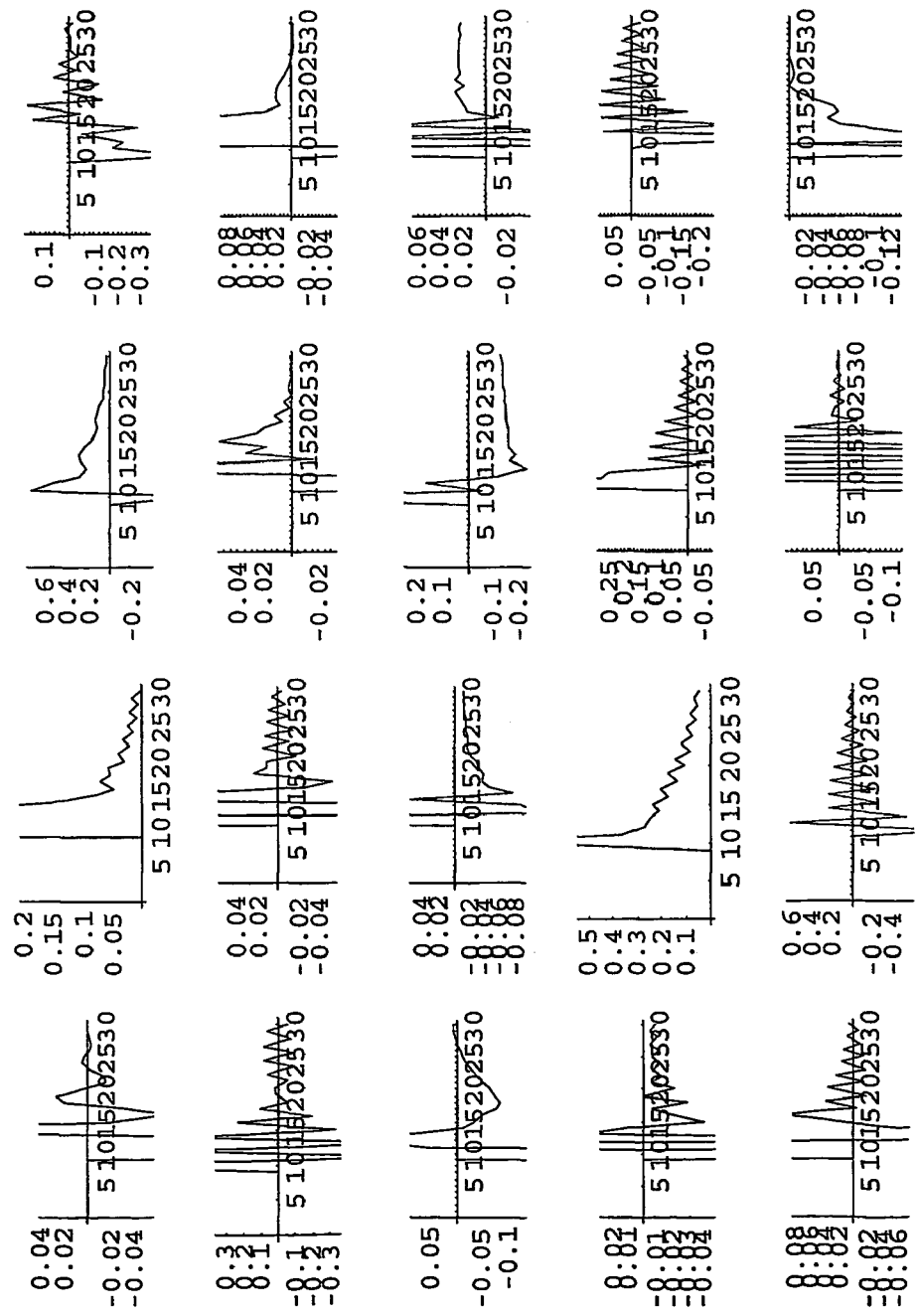
FIG. 7 shows various data sets obtained from the sixth example, an application of the method of the invention to learn a bidirectional device which can be used as a frequency meter or a frequency generator.
Figure 7:
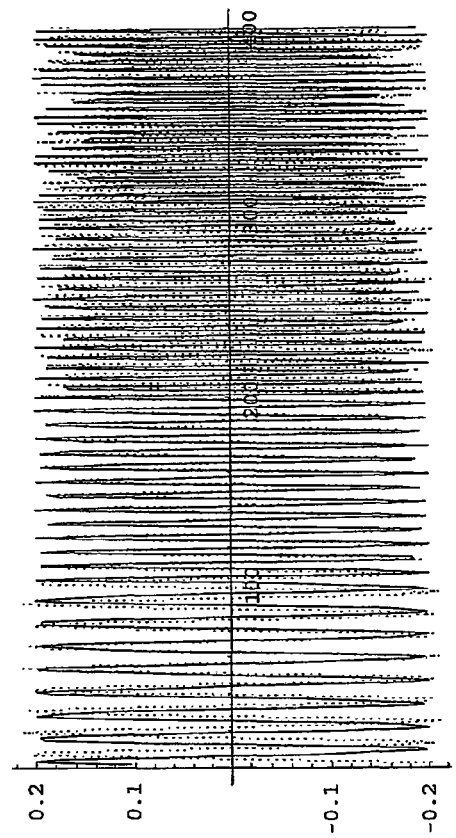
Figure 7:
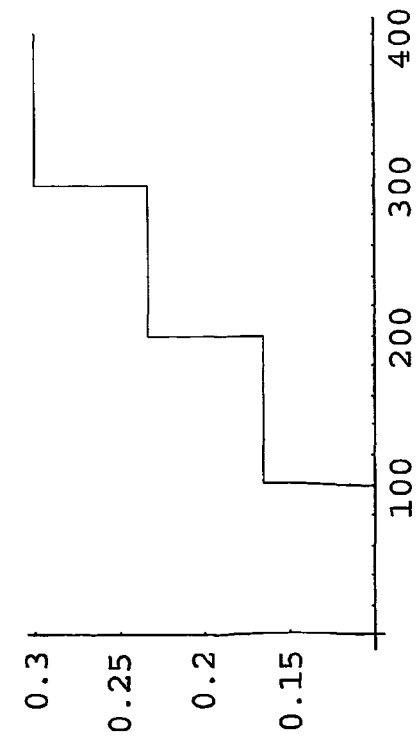
Figure 7:
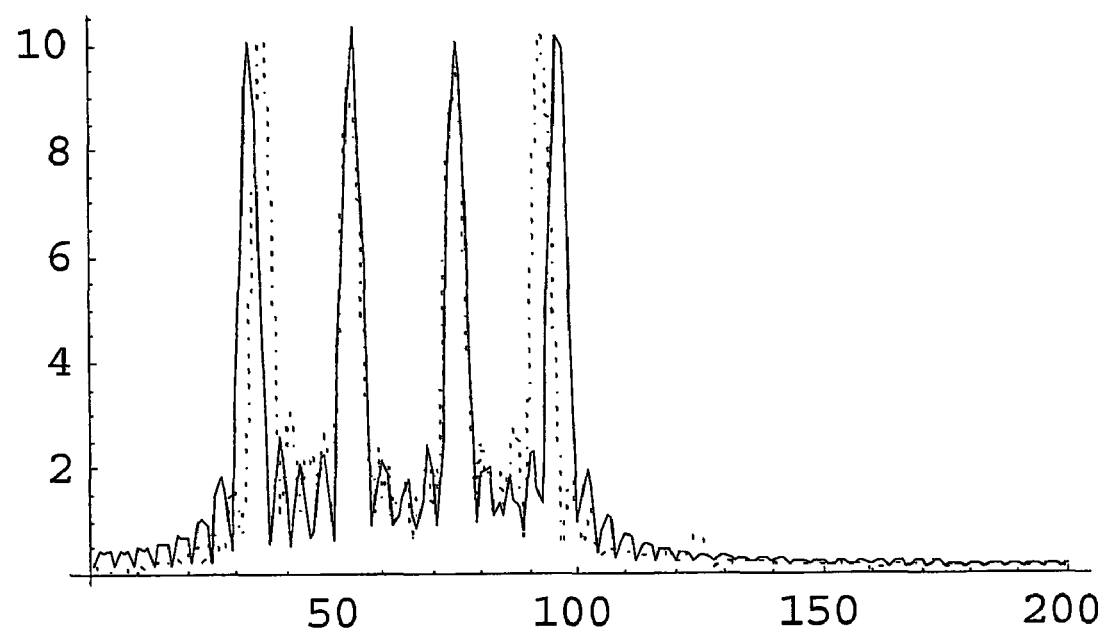
Figure 7:
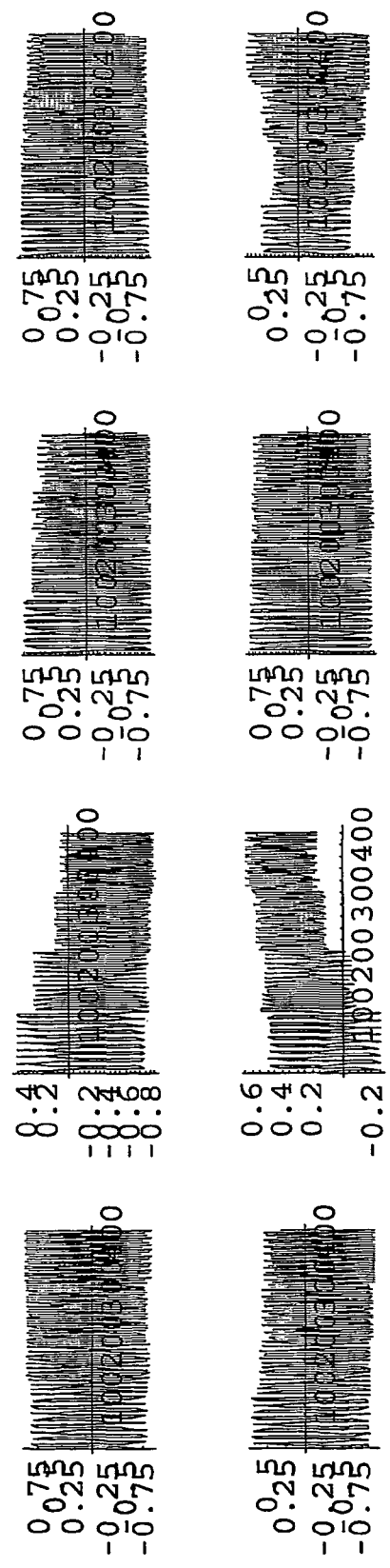
Figure 7:
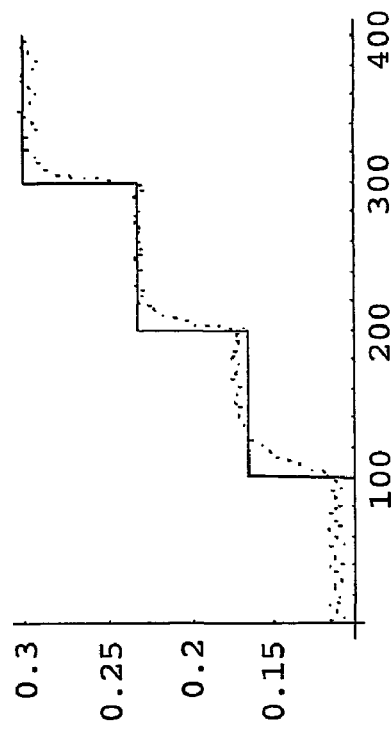
Figure 7:
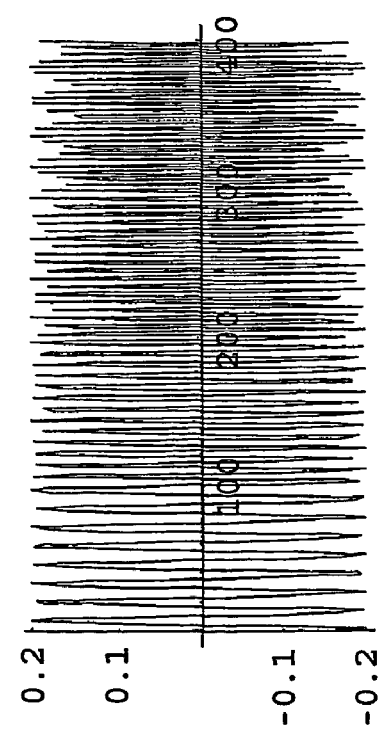

In the training phase, the first training channel is a slowly changing signal that varies smoothly but irregularly between 0.1 and 0.3 (FIG. 7a). The other training channel is a fast sine oscillation whose frequency is varying according the first signal (FIG. 7b, the apparent amplitude jitter is a discrete-sampling artifact).

The network was set up with a DR of 100 units. The connection weight matrix W was a band matrix with a width 5 diagonal band (i.e., $w_{ji}=0$ if $|j-i| \geq 3$). This band structure induces a topology on the units. The nearer two units (i.e., the smaller $|j-i|$ mod 100), the more direct their coupling. This locality lets emerge locally different activation patterns. FIG. 7c shows the impulse responses of every 5th unit (impulse input at timestep 10). The weights within the diagonal band were preliminarily set to +1 or −1 with equal probability. The weights were then globally and uniformly scaled until the resulting DR dynamics was marginally globally stable. This scaling resulted in weights of ±0.3304 with a stability margin of δ=0.0025 (stability margins are defined in the detailed description of preferred embodiments later in this document).

Additionally, the two extra units were equipped with feedback connections which projected back into the DR. These connections were established randomly with a connectivity of 0.5 for each of the two extra units. The weights of these feedback connections were chosen randomly to be ±1.24 for the first extra unit and ±6.20 for the second extra unit.

The network state was randomly initialized, and the network was run for 1100 steps for training. Two signals of the same kind as shown in FIGS. 7a,b were presented to the network (the target frequency signal to the first extra unit and the oscillation to the second) and the correct teacher output was written into the two output nodes (teacher forcing). The update of DR units was done with a small additive noise according to Eq. (1'). The noise was sampled from a uniform distribution over [−0.02, 0.02]. Data from the first 100 update steps were discarded. Data from the remaining 1000 update steps with teacher forcing were collected and used to obtain a linear regression solution of the least mean square error Eq. (4). The result were weights for the connections from DR units to the two output units.

In the exploitation phase, the trained RNN was used in either of two ways, as a frequency generator or as a frequency meter. In the exploitation phase, the no-noise version Eq. (1) of the update rule was used.

In the frequency generator mode of exploitation, the first extra unit was treated as a input unit, and the second as an output unit. A target frequency signal was fed into the input unit, for instance the 400 timestep staircase signal shown in FIG. 7d. At the second extra unit, here assigned to the output role, an oscillation was generated by the network. FIG. 7e shows an overlay of an oscillation of the correct frequency demanded by the staircase input (solid line) with the output actually generated by the network (dashed line). FIG. 7f shows an overlay of the frequency amplitudes (absolutes of Fourier transforms) of the output signal (solid line) and the network-generated output (dashed line). It appears from FIGS. 7e,f that the network has learnt to generate oscillations of the required frequencies, albeit with frequency distortions in the low and high end of the range. FIG. 7g shows traces of 8 arbitrarily selected units of the DR. They exhibit oscillations of the same frequency as the output signal, transposed and scaled in their amplitude range according to the input signal.

In the frequency meter mode of exploitation, the second extra unit was used as an input unit into which oscillations of varying frequency are written. The first extra unit served now as the output unit. FIG. 7h shows an input signal. FIG. 7i presents an overlay of the perfect output (solid line) with the actually generated output (dashed line). The network has apparently learnt to serve as a frequency meter, although again with some distortion in the low and high ends of range. A trace plot of DR units would look exactly like in the frequency generator mode and is omitted.

The challenge in this example is twofold. First, the network had to learn not an output dynamics per se, but rather "discover" the dynamical relationship between the two training signals. Second, the time scales of the two signals are very different: the frequency target is essentially stationary, while the oscillation signal changes on a fast timescale. A bidirectional information exchange between signals of different timescales, which was requested from the trained network, presents a particular difficulty. Using a noisy update rule during learning was found to be indispensable in this example to obtain stable dynamics in the trained network.

This example is an instance of another dependent claim of the invention, namely, to use the method of the invention to train an RNN on the dynamic relationship between several signals. More specifically, the claim is (1) to present training data $\tilde{y}_1(t), \ldots, \tilde{y}_n(t)$ to n extra units of a DR architecture according to the invention, where these extra units have feedback connections to the DR, (2) train the network such that the mean square error from Eq. (4) is minimized, and then (3) exploit the network in any "direction" by arbitrarily declaring some of the units as input units and the remaining ones as output units.

Discussion of Examples

The examples highlight what the invariant, independent core of the invention is, and what are dependent variants that yield alternative embodiments.

Common aspects in the examples are:
use of a DR, characterized by the following properties:
  its weights are not changed during learning
  its weights are globally scaled such that a marginally globally stable dynamics results
  the DR is designed with the aim that the impulse responses of different units be different
  the number of units is greater than would strictly be required for a minimal-size RNN for the respective task at hand (overcomplete basis aspect)

training only the DR-to-output connection weights such that the mean square error from Eq. (4) is minimized over the training data.

The examples exhibit differences in the following aspects:

The network may have a topological/spatial structure (2 dimensional grid in the excitable medium example and band matrix induced locality in two-way device example) or may not have such structuring (other examples).

The required different impulse responses of DR units can be achieved by explicit design of the DR (excitable medium example) or by random initialization (other examples).

The update law of the network can be the standard method of equation (1) (short term memory, excitable medium example) or other (leaky integration update rule in chaotic oscillator, noisy update in two-way device).

The computation of the DR-to-output connection weights can be done offline (short term memory, excitable medium, two-way device) or on-line (chaotic oscillator), using any standard method for mean square error minimization.

DETAILED DESCRIPTION OF THE INVENTION AND PREFERRED EMBODIMENTS

Preferred embodiments of the invention are now described in detail. Like in the Summary of the Invention, the detailed description is organized by presenting first the architectural and setup aspects, and then the procedural aspects of the learning method.

Setup of the DR

A central architectural aspect of the invention is the provision of the DR whose weights are fixed and are not changed by subsequent learning. The purpose of the DR for the learning method of this invention is to provide a rich, stable, preferably long-lasting excitable dynamics. The invention provides the following methods to realize this goal.

Rich Dynamics through Large Network Size

Preferred embodiments of the invention have relatively large DRs to provide for a rich variety of different unit dynamics. 50 units and (many) more would be typical cases, less than 50 units would be suitable only for undemanding applications like learning simple oscillators.

Rich Dynamics through Inhomogeneous Network Structure

Preferred embodiments of the invention achieve a rich variety in the impulse responses of the DR units by introducing inhomogeneity into the DR. The following strategies, which can be used singly or in combination, contribute to the design goal of inhomogeneity:

realize an inhomogeneous connectivity structure in the DR,
  by constructing the DR connection randomly and sparsely,
  by using a band-structured connectivity matrix, which leads to spatial decoupling of different parts of the DR (strategy not used in above examples),
  by imposing some other internal structuring on the DR topology, e.g. by arranging its units in layers or modules, equip DR units with different response characteristics, by giving them
  different transfer functions,
  different time constants,
  different connection weights.

Marginally Stable Dynamics through Scaling

A preferred method to obtain a DR with a globally stable dynamics is to first construct an inhomogeneous DR according to the previously mentioned preferred embodiments, and then globally scale its weights by a common factor $\alpha$ which is selected such that 1. the network dynamics is globally stable, i.e. from any starting activation the dynamics decays to zero, and
2. this stability is only marginal, i.e. the network dynamics becomes unstable if the network weights are further scaled by a factor $\alpha'=1+\delta$, which is greater than unity by a small margin.

When $\delta$ in the scaling factor $\alpha'=1+\delta$ is varied, the network dynamics undergoes a bifurcation from globally stable to some other dynamics at a critical value $\delta_{crit}$. This value was called the stability margin in the examples above. The only method currently available to determine the stability margin of a given scaling factor is by systematic search.

Tuning Duration of Short-Term Memory through Tuning Marginality of Stability

In many applications of RNNs, a design goal is to achieve a long short-term memory in the learnt RNN. This design goal can be supported in embodiments of the invention by a proper selection of the stability margin of the DR.

The smaller the stability margin, the longer the effective short-term memory duration. Therefore, the design goal of long-lasting short-term memory capabilities can be served in embodiments of the invention by setting the stability margin to small values. In typical embodiments, where maximization of short-term memory duration is a goal, values of $\delta$ smaller than 0.1 are used.

Presenting Input to the DR

In the field of artificial neural networks, by far the most common way to present input to networks is by means of extra input units. This standard method has been used in the above examples. Alternative methods to feed input into a RNN are conceivable, but either are essentially notational variants of extra input units (e.g., adding input terms into the DR unit activation update equation Eq. (1)) or are very rarely used (e.g., modulating global network parameters by input). Any method is compatible with the method of the invention, as long as the resulting dynamics of the DR is (1) significantly affected by the input, (2) the required variability of individual DR unit's dynamics is preserved.

The most common way of presenting input (by extra input units) is now described in more detail.

According to the method of the invention, the connectivity pattern from input units to the DR network, and the weights on these input-DR-connections, are fixed at construction time and are not modified during learning.

In preferred embodiments of the invention, the input-DR-connections and their weights are fixed in two steps. In step 1, the connectivity pattern is determined and the weights are put to initial values. In step 2, the weight values are globally scaled to maximize performance. These two steps are now described in more detail.

Step 1: Establish input-to-DR connections and put their weights to initial values. The design goal to be achieved in step 1 is to ensure a high variability in the individual DR units' responses to input signals. This goal is reached, according to the method of the invention, by following the following rules, which can be used in any combination:

- Provide connections sparsely, i.e., put zero weights to many or most of the possible connections from an output unit to DR units.
- Select the feedback weights of non-zero connections randomly by sampling from a probability distribution (as in the chaotic oscillator learning example).
- Assign different signs to the feedback weights of non-zero connections, i.e. provide both inhibitory and excitatory feedback connections.

Step 2: Scale the weights set in step 1 globally. The goal of step 2 is to optimize performance. No general rule can be given. According to the specific purpose of the network, different scaling ranges can be optimal, from very small to very large absolute weights. It will be helpful to observe the following rules, which are given here for the convenience of the user. They are applicable in embodiments where the update rule of the DR network employs nonlinear (typically, sigmoid) transfer functions.

- Large weights are preferred for fast, high-frequency I/O response characteristics, small weights for slow signals or when some lowpass characteristics are desired. For instance, in training a multistable (multiflop) memory network (not described in this document), where the entire network state had to switch from one attractor to another through a single input impulse, quite large input-to-DR weights with values of ±5.0 were used.
- Large weights are preferred when highly nonlinear, "switching" I/O dynamics are desired, small weights are preferred for more linear I/O-dynamics.
- Large weights are preferred for tasks with low temporal memory length requirements (i.e., output at time t depends significantly only on few preceding inputs and outputs), small weights for long temporal memory effects. For instance, in the delay line example (where large memory length was aimed for), very small input-to-DR weights of ±0.001 were used.
- If there are many input channels, channels whose input-DR-connections have greater absolute weights are emphasized in their influence on the system output compared to low-weight channels.

Reading Output from the Network in the Exploitation Phase

According to the method of the invention, output is read from the network always from output units. During the exploitation phase, the j-th output $y_j(t+1)$ (j=1, ..., m) is obtained from the j-th output unit by an application of the update rule Eq. (1), i.e. by $y_j(t+1)=f_j<w_j,x(t)>$, where the inner product $<w_j,x(t)>$ denotes the sum of weighted activations of input units u(t), DR units x(t), and output units y(t):

$$w_{j1}u_1(t)+ \ldots +w_{jn}u_n(t)+w_{j,n+1}x_1(t)+ \ldots +w_{j,n+K}x_K(t)+w_{j,n+K+1}y_1(t)+ \ldots +w_{j,n+K+m}y_m(t),$$

passed through the transfer function $f_j$ of the j-th output unit. In typical embodiments, $f_j$ is a sigmoid or a linear function.

Feedback Connections from Output Units to the DR

Depending on the desired task, the method of the invention provides two alternatives concerning feedback from the output units to the DR: (a) the network can be set up without such connections, (b) the network can be equipped with such connections. Embodiments of the invention of type (a) will typically be employed for passive filtering tasks, while case (b) typically is required for active signal generation tasks.

However, feedback connections can also be required in filtering tasks, especially when the filtering task involves modeling a system with an autonomous state dynamics (as in the two-way device example). This situation is analogous, in linear signal processing terminology, to infinite impulse response (IIR) filters. However, this terminology is commonly used for linear filters. RNNs yield nonlinear filters. Therefore, in this patent application another terminology shall be used. RNNs which have input and feedback connections from the output units will be referred to as serving active filtering tasks.

According to the method of the invention, when feedback connections are used (i.e., in signal generation or active filtering tasks), they are fixed at the design time of the network and not changed in the subsequent learning.

The setup of output-to-DR feedback connections is completely analogous to the setup of input-to-DR connections, which was described in detail above. Therefore, it suffices here to repeat that in a preferred embodiment of the invention, the output-to-DR feedback connections are designed in two steps. In the first step, the connectivity pattern and an initial set of weights are fixed, while in the second step the weights are globally scaled. The design goals and heuristic rules described for input-to-DR connections apply to output-to-DR connections without change, and need not be repeated.

Optimizing the Output MSE by Training the DR-to-Output Weights

After the network has been set up by providing a DR network and suitable input- and output facilities, as related above, the method of the invention proceeds to determine the weights from DR units (and also possibly from input units, if they are provided) to the output units. This is done through a supervised training process.

Training Criterium: Minimizing Mean Square Output Error

The weights of connections to output units are determined such that the mean square error Eq. (4) is minimized over the training data. Equation (4) is here repeated for convenience:

$$E[\varepsilon_j^2] = \frac{1}{N-1}\sum_{t=1}^{N-1}(f^{-1}(\tilde{y}_j(t+1)) - \langle w_j, x(t)\rangle)^2. \quad (4)$$

In (4), $\tilde{y}_j(t)$ is the desired (teacher) output of the j-th output unit, to which the inverse of the transfer function $f_j$ of this unit is applied. The term $<w_j,x(t)>$ denotes the inner product $$w_{j1}u_1(t)+ \ldots +w_{jn}u_n(t)+w_{j,n+1}x_1(t)+ \ldots +w_{j,n+K}x_K(t)+w_{j,n+K+1}y_1(t)+ \ldots +w_{j,n+K+m}y_m(t), \quad (5) \text{ [reapeated]}$$

where $u_i(t)$ are activations of input units (if applicable), $x_i(t)$ of DR units, and $y_i(t)$ of output units.

In alternative embodiments of the invention which employ online adaptive methods, instead of mining the MSE Eq. (4), it is also possible to minimize the following mean square error:

$$E[\varepsilon_j^2] = \frac{1}{N-1}\sum_{t=1}^{N-1}(\tilde{y}_j(t+1) - f_j\langle w_j, x(t)\rangle)^2. \quad (4')$$

The theoretical difference between the two variants is that in the first case (Eq. (4)), the learning procedure will minimize output unit state error, while in the second case, output value error is minimized. In practice this typically does not make a significant difference, because output unit state and output value are directly connected by the transfer function. In the examples described in the examples section, version (4) was used throughout.

In yet alternative embodiments of the invention, the MSE to be minimized refers only to a subset of the input, DR, and output units. More precisely, in these alternative embodiments, the MSE $$E[\varepsilon_j^2] = \frac{1}{N-1} \sum_{t=1}^{N-1} (f^{-1}(\tilde{y}_j(t+1)) - \langle s \cdot w_j, x(t) \rangle)^2 \quad (4^*)$$

or $$E[\varepsilon_j^2] = \frac{1}{N-1} \sum_{t=1}^{N-1} (\tilde{y}_j(t+1) - f_j \langle s \cdot w_j, x(t) \rangle)^2 \quad (4'^*)$$

is minimized, where s is a vector of the same length as $w_j$, consisting of 0's and 1's, and $r \cdot s = (r_1 \ldots r_k) \cdot (s_1 \ldots s_k) = (r_1 s_1 \ldots r_k s_k)$ denotes elementwise multiplication. The effect of taking $\langle s \cdot w_j, x(t) \rangle$ instead of $\langle w_j, x(t) \rangle$ is that only the input/DR/output units selected by the selection vector s are used for minimizing the output error. The connection weights from those input/DR/output units which are marked by 0's in s, to the output units, are put to zero. Specifically, variants (4*) or (4'*) can be used to preclude the learning of output-to-output connections. Variant (4*) was used in the examples "short-time memory" and "feedback controller" (precluding output-to-output feedback), and in the "excitable medium" example (extensive use of (4*) for defining the local neighborhoods shown in FIGS. 4a,b).

Training Method: Supervised Teaching with Teacher Forcing

According to the method of the invention, the MSE (4), (4'), (4*) or (4'*) is minimized through a procedure of supervised teaching. A training sequence consisting of an input time series u(t) and a (desired) output time series $\tilde{y}(t)$ must be available, where t=1,2, . . . , N. The input sequence u(t) may be absent when the learning task is to learn a purely generative dynamics, as in the Lorenz attractor and the excitable medium examples.

According to the method of the invention, the activations of the DR are initialized at time t=1. Preferably, the DR activations are initialized to zero or to small random values.

The method of the invention can be used for constructive offline learning and for adaptive online learning. The method of the invention can be adjusted to these two cases, as detailed below. However, several aspects of the invention are independent from the online/offline distinction.

According to one aspect which is independent from the online/offline distinction, the input training sequence u(t) is fed into the DR for t=1,2, . . . , N.

According to another aspect of the invention which is independent from the online/offline distinction, the output training sequence $\tilde{y}(t)=(\tilde{y}_1(t), \ldots, \tilde{y}_m(t))$ is written into the m output units, i.e., the activation $y_j(t)$ of the j-th output unit (j=1, . . . , m) at time t is set to $\tilde{y}_j(t)$. This is known in the RNN field as teacher forcing. Teacher forcing is essential in cases where there are feedback connections from the output units to the DR. In cases where such feedback connections are not used, teacher forcing is inconsequential but assumed nonetheless for the convenience of a unified description of the method.

According to another procedural aspect of the invention which is independent from the online/offline distinction, the DR units are updated for time steps t=1,2, . . . , N. The particular update law is irrelevant for the method of the invention. The repeated update of the DR generates an activation vector sequence x(1), . . . , x(N), where x(t) is a vector containing the activations of the network's units (including input units but excluding output units) at time t.

In preferred embodiments of the invention, a small amount of noise is added to the network dynamics during the training phase. One method to add noise is to use update equation (1'), i.e. add a noise term to each network state at each update time. An alternative method to introduce noise is to add noise to the input signals u(t) and/or $\tilde{y}(t)$. More specifically, instead of writing u(t) into the input units, write u(t)+v(t) into them; and instead of teacher-forcing $\tilde{y}(t)$ into the output units, write $\tilde{y}(t)+v(t)$ into the output units (v(t) is a noise term). Note however that when a noisy signal $\tilde{y}(t)+v(t)$ is used for teacher-forcing, the to-be-minimized MSE still refers to the non-noisified versions of the training output, i.e. to the chosen variant of Eq. (4).

Adding noise to the network dynamics is particularly helpful in signal generation and active signal processing tasks, where output-to-DR feedback connections are present. In such cases, the added noise randomly excites such internal units which have no stable systematic dynamic relationship with the desired I/O behavior; as a consequence, weights from such "unreliable" units to the output units receive very small values from the learning procedure. The net effect is that the resulting trained network behaves more robustly (i.e., less susceptible to perturbations). Adding noise was found to be indispensable in the "two-way device" example.

Adding noise is also beneficial in cases where the training data set is not much larger than the network size. In such cases, there is danger of overfitting the training data, or stated in an alternative way: it is then difficult to achieve good generalization performance. Insertion of noise prevents the network from fitting to idiosyncrasies in the training data, thereby improving generalization. Adding noise to counteract overfitting was a necessity in the "pendulum control" example, where only a small part of the plant's control regime was visited during training, but still a reasonably generalized performance was achieved.

Further aspects of the invention are specific for the alternative cases of off-line learning and on-line learning. Detailed descriptions follow of how the method of the invention works in the two cases.

Description of One Update Step for Data Collection in the Training Phase (Offline Case)

When the method of the invention is used for offline learning, the training data are presented to the network for t=1,2, . . . , N, and the resulting network states during this period are recorded. After time N, these data are then used for offline construction of MSE-minimizing weights to the output units. According to the method of the invention, the following substeps must be performed to achieve one complete update step.

Input to Update Step t→t+1:
1. DR units activation state $x_1(t), \ldots, x_K(t)$
2. output units activation state $y_1(t), \ldots, y_m(t)$ (identical to teacher signal $\tilde{y}_1(t), \ldots, \tilde{y}_m(t)$)
3. input signal $u_1(t+1), \ldots, u_n(t+1)$ [unless the task is a pure signal generation task without input]
4. teacher output $\tilde{y}_1(t+1), \ldots, \tilde{y}_m(t+1)$ Output After Update Step t→t+1:
1. DR units activation state $x_1(t+1), \ldots, x_K(t+1)$ Side Effect of Update Step t→t+1:
1. Network state vector $x(t+1)$ and teacher output $\tilde{y}_1(t+1), \ldots, \tilde{y}_m(t+1)$ are written to memory Substeps:
1. [unless the task is a pure signal generation task without input] Feed input $u_1(t+1), \ldots, u_n(t+1)$ to the network, using the chosen input presentation method. When input is fed into the network by means of extra input units (the standard way), this means that the activations of the n input units are set to $u_1(t+1), \ldots, u_n(t+1)$. The total network state is now $u_1(t+1), \ldots, u_n(t+1), x_1(t), \ldots, x_K(t), y_n(t), \ldots, y_n(t)$ [in the case when input units are used; otherwise omit the first $u_1(t+1), \ldots, u_n(t+1)$].
2. Update the state of the DR units, by applying the chosen update rule. For instance, when Eq. (4) is used, for every $i=1 \ldots, K$ evaluate $$x_i(t+1) = f_i(w_{i1}u_1(t+1) + \ldots + w_{in}u_n(t+1) + w_{i,n+1}x_1(t) + \ldots + w_{i,n+K}x_K(t) + w_{i,n+K+1}y_1(t) + \ldots + w_{i,n+K+m}y_m(t))$$

3. Write $x(t+1)=u_1(t+1), \ldots, u_n(t+1), x_1(t+1), \ldots, x_K(t+1), y_1(t), \ldots, y_n(t)$ and $\tilde{y}_1(t+1), \ldots, \tilde{y}_m(t+1)$ into a memory for later use in the offline computation of optimal weights. [In cases where the MSE to be minimized is of form (4*), write into memory $x(t+1)=s \cdot (u_1(t+1), \ldots, u_n(t+1), x_1(t+1), \ldots, x_K(t+1), y_1(t), \ldots, y_n(t))$]
4. Write the teacher signal $\tilde{y}_1(t+1), \ldots, \tilde{y}_m(t+1)$ into the output units (teacher forcing), i.e. put $y_1(t+1), \ldots, y_m(t+1)=\tilde{y}_1(t+1), \ldots, \tilde{y}_m(t+1)$.

Description of the Optimal Weight Computation in the Offline Case

At time N, N state-teacher output pairs $x(t), \tilde{y}_1(t), \ldots, \tilde{y}_m(t)$ have been collected in memory. The method of the invention proceeds now to compute weights $w_{j,i}$ from all units which have entry 1 in the selection vector $s_{EINBETTEN}x(t)$ to the j output units. These weights are computed such that the chosen variant of MSE (e.g., (4) or (4*)) is minimized. Technically, this is a linear regression task, for which many efficient methods are available. (Technical data analysis software packages, like MatLab, Mathematica, LinPack, or statistical data analysis packages, all contain highly refined linear regression procedures. For the production of the examples described in this document, the FIT procedure of Mathematica was used). Because the particular way of how this linear regression is performed is not part of the invention, and because it will not present any difficulties to the practicing in the field, only the case that the MSE (4) is minimized is briefly treated here.

As a preparation, it is advisable to discard some initial state-teacher output pairs, accommodating for the fact initial transients in the network should die out before data are used for training. After this, for each output unit j, consider the argument-value vector data set $(x(t), f^{-1}(\tilde{y}_j(t)))_{t=t_0, \ldots, N}$. Compute linear regression weights for least mean square error regression of the values $f^{-1}(\tilde{y}_j(t))$ on the arguments $x(t)$, i.e. compute weights $w_{j,i}$ such that the MSE Eq. (4) is minimized.

Write these weights into the network, which is now ready for exploitation.

Description of One Update Step in the Exploitation Phase

When the trained network is exploited, input $u_1(t), \ldots, u_n(t)$ is fed into it online [unless it is a pure signal generation device], and the network produces output $y_1(t), \ldots, y_m(t)$ in an online manner. For convenience, a detailed description of an update step of the network during exploitation is given here.

Input to Update Step t→t+1:
1. DR units activation state $x_1(t), \ldots, x_K(t)$
2. output units activation state $y_1(t), \ldots, y_m(t)$
3. input signal $u_1(t+1), \ldots, u_n(t+1)$ [unless the task is a pure signal generation task without input]

Output After Update Step t→t+1:
1. DR units activation state $x_1(t+1), \ldots, x_K(t+1)$
2. output units activation state $y_1(t+1), \ldots, y_m(t+1)$ Substeps:
1. [unless the task is a pure signal generation task without input] Feed input $u_1(t+1), \ldots, u_n(t+1)$ to the network.
2. Update the state of the DR units, by applying the chosen update rule. For instance, when Eq. (4) is used, for every $i=1, \ldots, K$ evaluate $$x_i(t+1) = f_i(w_{i1}u_1(t+1) + \ldots + w_{in}u_n(t+1) + w_{i,n+1}x_1(t) + \ldots + w_{i,n+K}x_K(t) + w_{i,n+K+1}y_1(t) + \ldots + w_{i,n+K+m}y_m(t))$$

3. Update the states of the output units, by applying the chosen update rule. For instance, when Eq. (4) is used, for every $j=1 \ldots, m$ evaluate $$y_j(t+1) = f_j(w_{j1}u_1(t+1) + \ldots + w_{jn}u_n(t+1) + w_{j,n+1}x_1(t+1) + \ldots + w_{j,n+K}x_K(t+1) + w_{j,n+K+1}y_1(t) + \ldots + w_{j,n+K+m}y_m(t))$$

The important part to note here is the "cascaded" update: first the DR units are updated in substep 2, then the output units are updated in substep 3. This corresponds to a similarly "cascaded" update in the training phase.

Variations

In updating recurrent neural networks with extra input- and output units, there is a some degree of liberty in the particular relative update order of the various types of units (input, DR, output). For instance, instead of the particular "cascaded" update described above, in alternative embodiments the DR units and output units can be updated simultaneously, resulting in slightly (but typically not significantly) different network behavior. In yet other alternative embodiments, where the DR is endowed with a modular or layered substructure, more complex update regulations may be required, updating particular regions of the network in a particular order. The important thing to observe for the method of the invention is that whichever update scheme is used, the same scheme must be used in the training and in the exploitation phase.

Description of One LMS Update Step for Online Adaptation

In contrast to the offline variants of the method, online adaptation methods can be used both for minimizing output state error (MSE criteria (4), (4*)) and for minimizing output value error (MSE criteria (4'), (4'*)).

In online adaptation, the weights $w_{j,i}$ to the j-th output unit are incrementally optimized at every time step, thereby becoming time-dependent variables $w_{j,i}(t)$ themselves. A host of well-known methods for online MSE-minimizing adaptation can be used for the method of the invention, for instance stochastic gradient descent methods like the LMS method or Newton's method (or combinations thereof), or so-called "deterministic" methods like the RLS method.

Among these, the LMS method is by far the simplest. It is not optimally suited for the method of the invention (the reasons for this have been indicated in the discussion of the Lorenz attractor example). Nonetheless, owing to its simplicity, LMS is the best choice for a didactical illustration of the principles of the online version of the method of the invention.

Here is a description of one update step, using the LMS method to optimize weights.

Input to Update Step $t \rightarrow t+1$:
1. DR units activation state $x_1(t), \ldots, x_K(t)$
2. output units activation state $y_1(t), \ldots, y_m(t)$
3. input signal $u_1(t+1), \ldots, u_n(t+1)$ [unless the task is a pure signal generation task without input]
4. teacher output $\tilde{y}_1(t+1), \ldots, \tilde{y}_m(t+1)$
5. weights $w_{j,i}(t)$ of connections to the output units Output After Update Step $t \rightarrow t+1$:
1. DR units activation state $x_1(t+1), \ldots, x_K(t+1)$
2. output units activation state $y_1(t+1), \ldots, y_m(t+1)$
3. new weights $w_{j,i}(t+1)$ Substeps:
1. [unless the task is a pure signal generation task without input] Feed input $u_1(t+1), \ldots, u_n(t+1)$ to the network.
2. Update DR units, by applying the chosen update rule. For instance, when Eq. (4) is used, for every $i=1, \ldots, K$ evaluate $$x_i(t+1) = f_i(w_{i1}u_1(t+1) + \ldots + w_{in}u_n(t+1) + w_{i,n+1}x_1(t) + \ldots +$$
$$w_{i,n+K}x_K(t) + w_{i,n+K+1}y_1(t) + \ldots +$$
$$w_{i,n+K+m}y_m(t))$$

3. Update the states of the output units, by applying the chosen update rule. For instance, when Eq. (4) is used, for every $j=1, \ldots, m$ evaluate $$y_j(t+1) = f_j(w_{j1}u_1(t+1) + \ldots + w_{jn}u_n(t+1) + w_{j,n+1}x_1(t+1) + \ldots +$$
$$w_{j,n+K}x_K(t+1) + w_{j,n+K+1}y_1(t) + \ldots +$$
$$w_{j,n+K+m}y_m(t))$$

4. For every output unit $j=1, \ldots, m$, update weights $w_j(t)=(w_{j,1}(t), \ldots, w_{j,n+K+m}(t))$ to $w_j(t+1)$, according to the adaptation method chosen. Here the LMS method is described as an example. It comprises the following substeps:
   a. Compute the error $\epsilon_j(t+1)=\tilde{y}_j(t+1)-y_j(t+1)$. [Note: this yields an output value error, and consequentially, the MSE of Eq. (4') will be minimized. In order to minimize the output state error, use $\epsilon_j(t+1)= f_j^{-1}(\tilde{y}_j(t+1))-f_j^{-1}(y_j(t+1))$ instead.]
   b. Put $w_j(t+1)=w_j(t)+\mu\epsilon_j(t+1)x(t)$, where $\mu$ is a learning rate and $x(t)$ is the total network state (including input and output units) obtained after step 3.
5. If there are output-to-DR feedback connections, write the teacher signal $\tilde{y}_1(t+1), \ldots, \tilde{y}_m(t+1)$ into the output units (teacher forcing), i.e. put $y_1(t+1), \ldots, y_m(t+1)= \tilde{y}_1(t+1), \ldots, \tilde{y}_m(t+1)$ Like in the offline version of the method of the invention, many trivial variations of this update scheme exist, distinguished from each other e.g. by the update equation (which version of Eq. (4)), by the particular order in which parts of the network are updated in a cascaded fashion, by the specific method in which input is administered, etc. These variations are not consequential for the method of the invention; the above detailed scheme of an update step is only an illustration of one possibility.

The invention claimed is:

1. A method for constructing a discrete-time recurrent neural network and training it in order to minimize its output error, comprising;
   constructing a recurrent neural network as a reservoir for excitable dynamics (dynamical reservoir network;
   providing means of feeding input to the dynamical reservoir network;
   attaching output units to the dynamical reservoir network through weighted connections; and
   training the weights of the connections only from the dynamical reservoir network to the output units in a supervised training scheme.

2. The method of claim 1, wherein the dynamical reservoir network has a number of units greater than 50.

3. The method of claim 1 or 2, wherein the dynamical reservoir network is sparsely connected.

4. The method of claim 1, wherein the connections within the dynamical reservoir network have randomly assigned weights.

5. The method of claim 1, wherein different update rules or differently parameterized update rules are used for different dynamical reservoir units.

6. The method of claim 1, wherein a spatial structure is imprinted on the dynamical reservoir network through the connectivity pattern.

7. The method of claim 6, wherein the spatial structure is a regular grid.

8. The method of claim 6, wherein the spatial structure is a local neighborhood structure induced by banded or sub-banded structure of the connectivity matrix.

9. The method of claim 6, wherein the spatial structure is modular or organized in levels.

10. The method of claim 1, wherein the weights within the dynamical reservoir are globally scaled such that the resulting dynamics of the isolated dynamical reservoir network is globally stable.

11. The method of claim 1, wherein the weights within the dynamical reservoir are globally scaled such that the resulting dynamics of the isolated dynamical reservoir network is marginally globally stable, in order to achieve long duration of memory effects in the final network after training.

12. The method of claim 10 or 11, wherein input is fed to the dynamical reservoir by means of extra input units.

13. The method of claim 12, wherein the connections from the input units to the dynamical reservoir are sparse.

14. The method of claim 12, wherein the weights of connections from the input units to the dynamical reservoir are randomly fixed and have negative and positive signs.

15. The method of claim 12, wherein the weights of connections from the input units to the dynamical reservoir are globally scaled to small absolute values in order to achieve a long duration of memory effects in the final network I/O characteristics, or in order to achieve slow or low-pass time characteristics in the final network I/O characteristics, or in order to achieve nearly linear I/O characteristics.

16. The method of claim 12, wherein the weights of connections from the input units to the dynamical reservoir are globally scaled to absolute large values in order to achieve short duration of memory effects, or in order to achieve fast I/O behavior, or in order to achieve highly nonlinear or "switching" characteristics in the final trained network.

17. The method of claim 10 or 11, wherein input is fed to the dynamical reservoir by means other than by extra input units.

18. The method of claim 1, wherein extra output units are attached to the dynamical reservoir without feedback connections from the output units to the dynamical reservoir, in order to obtain a passive signal processing network after training.

19. The method of claim 1, wherein extra output units are attached to the dynamical reservoir with feedback connections from the output units to the dynamical reservoir, in order to obtain an active signal processing or signal generation network after training.

20. The method of claim 19, wherein the feedback connections are sparse.

21. The method of claim 19 or 20, wherein the weights of feedback connections are randomly fixed and have negative and positive signs.

22. The method of claim 19, wherein the weights of feedback connections are globally scaled to small absolute values in order to achieve a long duration of memory effects in the final network I/O characteristics, or in order to achieve slow or low-pass time characteristics in the final network I/O characteristics, or in order to achieve linear I/O characteristics.

23. The method of claim 19, wherein the weights of connections from the input units to the dynamical reservoir are globally scaled to absolute large values in order to achieve short duration of memory effects, or in order to achieve fast I/O behavior, or in order to achieve highly nonlinear or "switching" characteristics in the final trained network.

24. The method of claim 1, wherein the network is trained in an offline version of supervised teaching.

25. The method of claim 24, wherein the task to be learnt is a signal generation task, no input exists, and the teacher signal consists only of a sample of the desired output signal.

26. The method of claim 24, wherein the task to be learnt is a signal processing task, where input exists, and where the teacher signal consists of a sample of the desired input/output pairing.

27. The methods of any one of claims 24 to 26, wherein output-error-minimizing weights of the connections to the output nodes are computed, comprising;
  presenting the teacher signals to the network and running the network in teacher-forced mode for the duration of the teaching period,
  saving into a memory the network states and the signals $f_j^{-1}(\tilde{y}_j(t))$ obtained by mapping the inverse of the output unit's transfer function on the teacher output,
  optionally discarding initial state/output pairs in order to accommodate initial transient effects, and
  computing the weights of the connections to the output nodes by a standard linear regression method.

28. The method of claim 24, wherein during the training period noise is inserted into the network dynamics, by utilizing a noisy update rule and/or by adding noise on the input and/or by adding a noise component to the teacher output before it is fed back into the dynamical reservoir if output to the dynamical reservoir feedback connections exist.

29. The methods of claim 24, wherein weights of connection from only a subset of the networks units (i.e., a subset of the input, dynamical reservoir, output units) to the output units are trained, and the other ones are set to zero.

30. The methods of claim 1, wherein the network is trained in an online version of supervised teaching.

31. The method of claim 30, wherein the task to be learnt is a signal generation task, no input exists, and the teacher signal consists only of a sample of the desired output signal.

32. The method of claim 30, wherein the task to be learnt is a signal processing task, where input exists, and where the teacher signal consists of a sample of the desired input/output pairing.

33. The method of any one of claims 30 to 32, wherein output-error-minimizing weights of the connections to the output nodes are updated at every time step, the update comprising;
  feeding the input to the network and updating the network,
  for every output unit, computing an error as the difference between the desired teacher output and the actual network output; or, alternatively, as the difference between the value $f_j^{-1}(\tilde{y}_j(t))$ obtained by mapping the inverse of the output unit's transfer function on the teacher output, and the value obtained by mapping the inverse of the output unit's transfer function on the actual output (output state error),
  updating the weights of the connections to the output nodes by a standard method for minimizing the error computed in the previous substep, and
  in cases of signal generation tasks or active signal processing tasks, forcing the teacher output into the output units.

34. The method of claim 30, wherein noise is inserted into the network dynamics, by utilizing a noisy update rule or by adding a noise component to the teacher output before it is fed back into the dynamical reservoir if feedback connections exist.

35. The method of claim 30, wherein weights of connection from only a subset of the networks units (i.e., a subset of the input, dynamical reservoir, output units) to the output units are trained, and the other ones set to zero.

36. The method of claim 1, wherein the network is trained on two or more output units with feedback connections to the dynamical reservoir, which in the exploitation phase are utilized in any chosen "direction", by treating any some of the trained units as input units and the remaining ones as output units to realize the learning of dynamical relationships between signals.

37. The method of claim 36 applied to tasks of reconstructive memory of multidimensional dynamical patterns, comprising;
- training the network with teaching signals consisting of complete-dimensional samples of the patterns, and
- in the exploitation phase, presenting cue patterns which are incompletely given in only some of the dimensions as input in those dimensions, and reading out the completed dynamical patterns on the remaining units.

38. The method of claim 1, applied to tasks of closed-loop state or observation feedback tracking control of a plant, comprising
- using training samples consisting of two kinds of input signals to the network, namely, (i) a future version of the variables that will serve as a reference signal in the exploitation phase, and (ii) plant output or plant state observation; and consisting further of a desired network output signal, namely, (iii) plant control input,
- training a network using the teacher input and output signal from a., in order to obtain a network which computes as network output a plant control input depending on the current plant output observation and a future version of reference variables,
- exploiting the network as an closed-loop controller by feeding it with the inputs (i) future reference signals, (ii) current plant output or plant state observation; and letting the network generate the current plant control input.

39. A neural network for constructing a discrete-time recurrent neural network and training it in order to minimize its output error comprising;
- a recurrent neural network as a reservoir for excitable dynamics dynamical reservoir network;
- means for feeding input to the dynamical reservoir network;
- output units attached to the dynamical reservoir network through weighted connections; and
- wherein the weights of the connections are trained only from the dynamical reservoir network to the output units in a supervised training scheme.

40. A neural network according to claim 39, wherein it is implemented as a microcircuit.

41. A neural network according to claim 39, wherein it is implemented by a suitably programmed computer.

* * * * *